(12) United States Patent
Hirose et al.

(10) Patent No.: US 8,437,604 B2
(45) Date of Patent: May 7, 2013

(54) INFORMATION PROCESS APPARATUS AND METHOD, PROGRAM, AND RECORD MEDIUM

(75) Inventors: Masaki Hirose, Tokyo (JP); Yoshiaki Shibata, Kanagawa (JP); Hideaki Mita, Hyogo (JP); Hiroshi Saitou, Osaka (JP); Tatsushi Bannai, Osaka (JP)

(73) Assignees: Sony Corporation, Tokyo (JP); Matsushita Electric Industrial Co., Ltd., Osaka (JP)

( * ) Notice: Subject to any disclaimer, the term of this patent is extended or adjusted under 35 U.S.C. 154(b) by 659 days.

(21) Appl. No.: 10/560,256

(22) PCT Filed: Jun. 8, 2004

(86) PCT No.: PCT/JP2004/008290
§ 371 (c)(1),
(2), (4) Date: Mar. 8, 2007

(87) PCT Pub. No.: WO2004/112026
PCT Pub. Date: Dec. 23, 2004

(65) Prior Publication Data
US 2007/0206920 A1      Sep. 6, 2007

(30) Foreign Application Priority Data

Jun. 11, 2003   (JP) ................................ 2003-165837

(51) Int. Cl.
*H04N 9/80* (2006.01)
(52) U.S. Cl.
USPC ....................................................... 386/239
(58) Field of Classification Search ............... 386/52–55, 386/239, 248, 323, 344
See application file for complete search history.

(56) References Cited

U.S. PATENT DOCUMENTS

| 6,532,334 | B1 * | 3/2003 | Kikuchi et al. | ................. 386/68 |
| 7,536,087 | B2 * | 5/2009 | Um et al. | ....................... 386/121 |

(Continued)

FOREIGN PATENT DOCUMENTS

| GB | 2312078 | 4/1996 |
| JP | 61-273665 | 12/1986 |

(Continued)

OTHER PUBLICATIONS

Wilkinson, James H. and Michael E. Cox, "Tools and Techniques for Globally Unique Content Identification", SMPTE Journal, Oct. 2000, pp. 795-799, vol. 109, No. 10.

(Continued)

*Primary Examiner* — Tat Chio
(74) *Attorney, Agent, or Firm* — Frommer Lawrence & Haug LLP; William S. Frommer

(57) ABSTRACT

To improve the convenience of a record medium and allow a record process and reproduction process to be more easily performed than before. When a clip edit list update process 121 that updates video data and audio data recorded on a disc 32 is executed, an index file management section 72 manages and updates an index file held in an index file hold section 51 as the video data and audio data are updated. At this point, a search section 92 searches disc internal IDs assigned to clips or edit lists contained in the index file for the maximum value. A disc internal ID generation section 91 generates a disc internal ID according to the maximum value. An index file management section 72 updates the index file with the disc internal ID generated by the disc internal ID generation section 91.

11 Claims, 30 Drawing Sheets

U.S. PATENT DOCUMENTS

2002/0131764 A1* 9/2002 David et al. .................. 386/69
2002/0152082 A1* 10/2002 Harradine et al. ............ 704/278

FOREIGN PATENT DOCUMENTS

| | | |
|---|---|---|
| JP | 62-278671 | 12/1987 |
| JP | 11-96731 | 4/1999 |
| JP | 2000-207261 | 7/2000 |
| JP | 2001-78135 | 3/2001 |
| JP | 2002-297628 | 10/2002 |
| JP | 2004-112602 | 4/2004 |
| WO | WO 01 75885 | 10/2001 |
| WO | WO 0175885 | 10/2001 |

OTHER PUBLICATIONS

EP Search Report; Apr. 1, 2011; Munich, Germany.

* cited by examiner

Fig. 7

```
1  <?xml version="1.0" encoding="UTF-8"?>
2  <indexFile xmlns="urn:schemas-professionalDisc:index"
3     indexId="0123456789ABCDEF0123456789ABCDEF">
4    <clipTable path="/PROAV/CLPR/">
5      <!-- Normal Clip -->
6      <clip id="C0001" umid="0D1213000000000000010444444484EEEEOOE0188E130B"
7        file="C0001C01.SMI" fps="59.94i" dur="12001" ch="4" aspectRatio="4:3">
8        <video umid="0D1213000000000000010444444484EEEEOOE0188E130B"
9          file="C0001V01.MXF" type="DV25_411" header="65536"/>
10       <audio umid="0D1213000000000000010444444484EEEEOOE0188E130B"
11         file="C0001A01.MXF" type="LPCM16" header="65536" trackDst="CH1"/>
12       <audio umid="0D1213000000000000010444444484EEEEOOE0188E130B"
13         file="C0001A02.MXF" type="LPCM16" header="65536" trackDst="CH2"/>
14       <audio umid="0D1213000000000000010444444484EEEEOOE0188E130B"
15         file="C0001A03.MXF" type="LPCM16" header="65536" trackDst="CH3"/>
16       <audio umid="0D1213000000000000010444444484EEEEOOE0188E130B"
17         file="C0001A04.MXF" type="LPCM16" header="65536" trackDst="CH4"/>
18       <subStream umid="0D1213000000000000010444444484EEEEOOE0188E130B"
19         file="C0001S01.MXF" type="PD-SubStream" header="65536"/>
20       <meta file="C0001M01.XML" type="PD-Meta"/>
21       <meta file="C0001M02.TXT" type="key:0123456789ABCDEF"/>
22       <rtmeta file="C0001R01.BIM" type="std2k" header="65536"/>
23     </clip>
24     <!-- Partial Deleted Clip -->
25     <clip id="C0002" umid="0D1213000000000000010444444484EEEEOOE0188E130B"
26        file="C0002C01.SMI" fps="59.94i" dur="4000" ch="4" aspectRatio="4:3">
27       <video umid="0D1213000000000000010444444484EEEEOOE0188E130B"
28         file="C0002V01.MXF" type="IMX50" header="80000"/>
29       <audio umid="0D1213000000000000010444444484EEEEOOE0188E130B"
```

Fig. 8

```
1      file="C0002A01.MXF" type="LPCM16" header="100000" trackDst="CH1"/>
2    <audio umid="0D1213000000000000000010444444484EEEE00E0188E130B"
3      file="C0002A02.MXF" type="LPCM16" header="100000" trackDst="CH2"/>
4    <audio umid="0D1213000000000000000010444444484EEEE00E0188E130B"
5      file="C0002A03.MXF" type="LPCM16" header="100000" trackDst="CH3"/>
6    <audio umid="0D1213000000000000000010444444484EEEE00E0188E130B"
7      file="C0002A04.MXF" type="LPCM16" header="100000" trackDst="CH4"/>
8    <subStream umid="0D1213000000000000000010444444484EEEE00E0188E130B"
9      file="C0002S01.MXF" type="PD-SubStream" header="90000"
10     clipBegin="8"/>
11   <meta file="C0002M01.XML" type="PD-Meta"/>
12   <rtmeta file="C0002R01.BIM" type="std2k" header="70000"/>
13 </clip>
14 <!-- Refered Clip -->
15 <clip id="C0003" umid="0D1213000000000000000010444444484EEEE00E0188E130B"
16   file="C0003C01.SMI" fps="59.94i" dur="100000" ch="4" aspectRatio="4:3"
17   referer="E0001 E0002 E0003">
18   <video umid="0D1213000000000000000010444444484EEEE00E0188E130B"
19     file="C0003V01.MXF" type="IMX50" header="65536"/>
20   <audio umid="0D1213000000000000000010444444484EEEE00E0188E130B"
21     file="C0003A01.MXF" type="LPCM16" header="65536" trackDst="CH1"/>
22   <audio umid="0D1213000000000000000010444444484EEEE00E0188E130B"
23     file="C0003A02.MXF" type="LPCM16" header="65536" trackDst="CH2"/>
24   <audio umid="0D1213000000000000000010444444484EEEE00E0188E130B"
25     file="C0003A03.MXF" type="LPCM16" header="65536" trackDst="CH3"/>
26   <audio umid="0D1213000000000000000010444444484EEEE00E0188E130B"
27     file="C0003A04.MXF" type="LPCM16" header="65536" trackDst="CH4"/>
28   <subStream umid="0D1213000000000000000010444444484EEEE00E0188E130B"
29     file="C0003S01.MXF" type="PD-SubStream" header="65536"/>
```

Fig. 9

```
1  <meta file="C0003M01.XML" type="PD-Meta"/>
2  <rtmeta file="C0003R01.BIM" type="std2k" header="65536"/>
3  </clip>
4  <!-- Long GOP -->
5  <clip id="C0004" umid="0D12130000000000001044444484EEEE00E0188E130B"
6  file="C0004C01.SMI" fps="59.94i" dur="12001" ch="4" aspectRatio="16:9"
7  referer="E0004">
8  <video umid="0D12130000000000001044444484EEEE00E0188E130B"
9  file="C0004V01.MXF" type="MPEG2HD25_1440_MP@HL" header="65536"/>
10 <audio umid="0D12130000000000001044444484EEEE00E0188E130B"
11 file="C0004A01.MXF" type="LPCM16" header="65536" trackDst="CH1"/>
12 <audio umid="0D12130000000000001044444484EEEE00E0188E130B"
13 file="C0004A02.MXF" type="LPCM16" header="65536" trackDst="CH2"/>
14 <audio umid="0D12130000000000001044444484EEEE00E0188E130B"
15 file="C0004A03.MXF" type="LPCM16" header="65536" trackDst="CH3"/>
16 <audio umid="0D12130000000000001044444484EEEE00E0188E130B"
17 file="C0004A04.MXF" type="LPCM16" header="65536" trackDst="CH4"/>
18 <subStream umid="0D12130000000000001044444484EEEE00E0188E130B"
19 file="C0004S01.MXF" type="PD-SubStream" header="65536"/>
20 <meta file="C0004M01.XML" type="PD-Meta"/>
21 <meta file="C0004I01.XML" type="PD-PP"/>
22 <rtmeta file="C0004R01.BIM" type="std2k" header="65536"/>
23 </clip>
24 </clipTable>
25 <editlistTable path="/PROAV/EDTR/">
26 <editlist id="E0001" umid="0D12130000000000001044444484EEEE00E0188E130B"
27 file="E0001E01.SMI" dur="500" fps="59.94i" ch="4" aspectRatio="4:3">
28 <meta file="E0001M01.XML" type="PD-Meta"/>
```

*Fig. 10*

```
1  </editlist>
2  <editlist id="E0002" umid="0D1213000000000000010444444484EEEE00E0188E130B"
3     file="E0002E01.SMI" dur="500" fps="59.94i" ch="4" aspectRatio="4:3">
4     <meta file="E0002M01.XML" type="PD-Meta"/>
5  </editlist>
6  <editlist id="E0003" umid="0D1213000000000000010444444484EEEE00E0188E130B"
7     file="E0003E01.SMI" dur="500" fps="59.94i" ch="4" aspectRatio="4:3">
8     <meta file="E0003M01.XML" type="PD-Meta"/>
9  </editlist>
10 <editlist id="E0004" umid="0D1213000000000000010444444484EEEE00E0188E130B"
11    file="E0003E01.SMI" dur="500" fps="59.94i" ch="4" aspectRatio="16:9">
12    <meta file="E0003M01.XML" type="PD-Meta"/>
13    <meta file="E0003I01.XML" type="PD-PP"/>
14 </editlist>
15 </editlistTable>
16 </indexFile>
```

Fig. 11

```
1   <?xml version="1.0" encoding="UTF-8"?>
2   <discinfo xmlns="urn:schemas-professionalDisc:discinfo">
3     <history>
4       <clip id="C0003" ftc="smpte-30-drop=00:30:12:23" />
5       <editlist id="E0001" ftc="smpte-30-drop=00:00:00:15" />
6       <tape id="C0003" ftc="smpte-30-drop=00:02:23:12" />
7       <editlist id="E0004" ftc="smpte-30-drop=00:00:10:02" />
8       <clip id="C0002" ftc="smpte-30-drop=00:01:02:03" />
9       <clip id="C0004" ftc="smpte-30-drop=00:05:43:21" />
10    </history>
11  </discinfo>
```

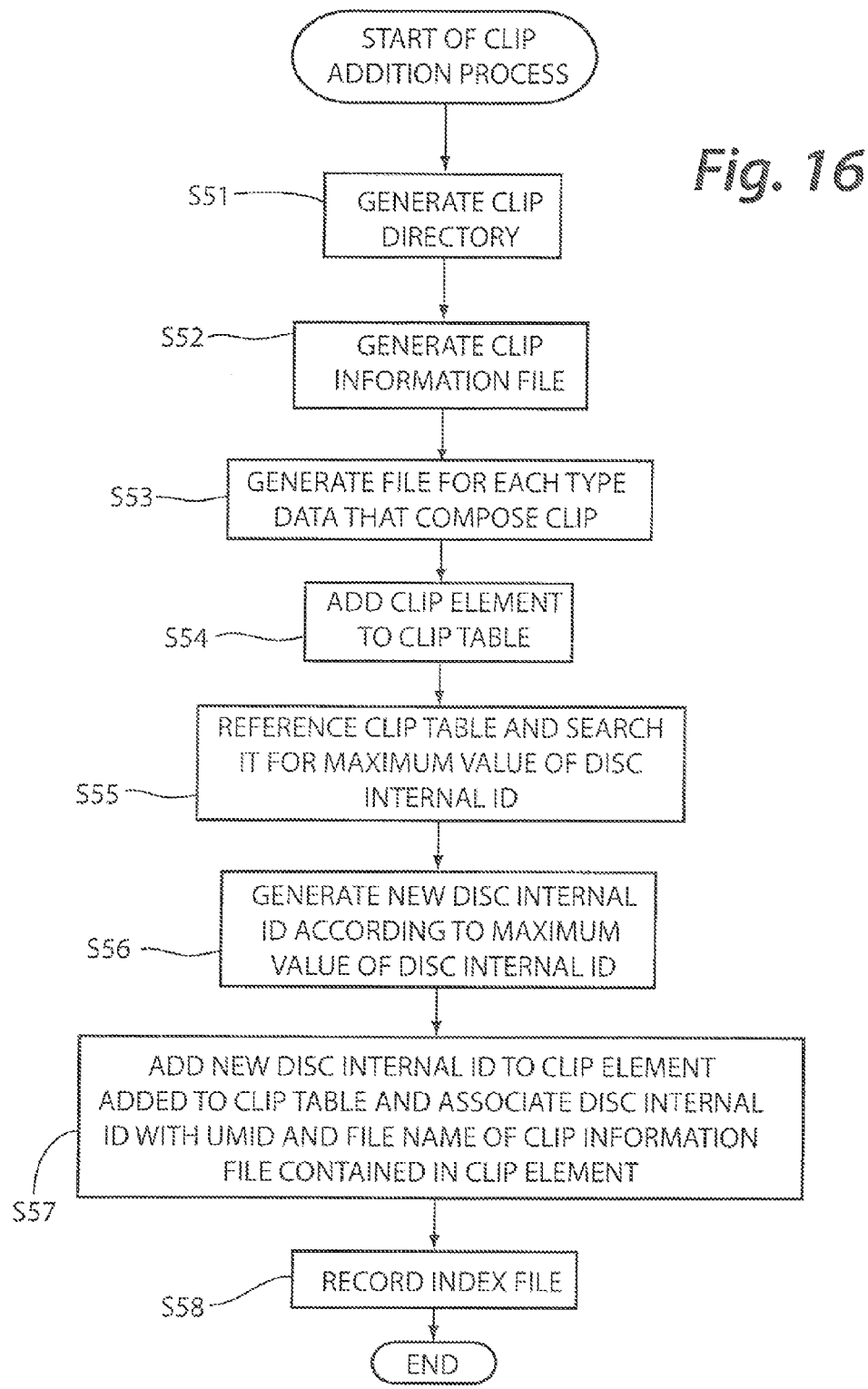

Fig. 17

```
1  <?xml version="1.0" encoding="UTF-8"?>
2  <smil xmlns="urn:schemas-professionalDisc:edl:clipInfo">
3    <head>
4      <metadata type="Meta">
5        <!-- nonrealtime meta -->
6        <NRMeta xmlns="urn:schemas:proDisc:nrt">
7          <ref src="C0001M01.XML"/>
8        </NRMeta>
9      </metadata>
10   </head>
11   <body>
12     <par>
13       <switch>
14         <!-- main stream -->
15         <par systemComponent="IMX50">
16           <video
17  src="urn:smpte:umid:060A2B3401010501010D1213000000001234567 89ABCDEF"
18  type="IMX50"/>
19           <audio
20  src="urn:smpte:umid:060A2B3401010501010D121300000000123456789ABCDEF0"
21  type="LPCM16" trackDst="CH1"/>
22           <audio
23  src="urn:smpte:umid:060A2B3401010501010D121300000002234567 89ABCDEF01"
24  type="LPCM16" trackDst="CH2"/>
25           <audio
26  src="urn:smpte:umid:060A2B3401010501010D121300000003456789ABCDEF012"
27  type="LPCM16" trackDst="CH3"/>
28           <audio
29  src="urn:smpte:umid:060A2B3401010501010D121300000004567 89ABCDEF0123"
```

Fig. 18

```
1  type="LPCM16" trackDst="CH4"/>
2     <audio
3     src="urn:smpte:umid:060A2B3401010105010D121300000056789ABCDEF0123456789ABCDEF01234"
4     type="LPCM16" trackDst="CH5"/>
5     <audio
6     src="urn:smpte:umid:060A2B3401010105010D121300000006789ABCDEF0123456789ABCDEF012345"
7     type="LPCM16" trackDst="CH6"/>
8     <audio
9     src="urn:smpte:umid:060A2B3401010105010D121300000000789ABCDEF0123456789ABCDEF0123456"
10    type="LPCM16" trackDst="CH7"/>
11    <audio
12    src="urn:smpte:umid:060A2B3401010105010D121300000000089ABCDEF0123456789ABCDEF01234567"
13    type="LPCM16" trackDst="CH8"/>
14    </par>
15    <!-- sub stream -->
16    <ref
17    src="urn:smpte:umid:060A2B3401010105010D121300000000009ABCDEF0123456789ABCDEF012345678"
18    type="SubStream" systemComponent="SubStream"/>
19    </switch>
20    <!-- realtime meta -->
21    <metastream src="C0001R01.BIM" type="required2k"/>
22    </par>
23  </body>
24 </smil>
```

Fig. 20

```
1   <?xml version="1.0" encoding="UTF-8"?>
2   <smil xmlns="urn:schemas-professionalDisc:edl:editList">
3     <head>
4       <metadata type="Meta">
5         <!-- nonrealtime meta -->
6         <NRMeta xmlns="urn:schemas:professionalDisc:nrt">
7           <ref src="E0002M01.XML"/>
8         </NRMeta>
9       </metadata>
10    </head>
11    <body>
12      <par>
13        <!-- Clip1 -->
14        <ref
15  src="urn:smpte:umid:060A2B34010101050101010D1213000000FEDCBA9876543210"
16  type="edlDoc" begin="smpte-30=00:00:00" clipBegin="smpte-30=00:00:00" clipEnd="smpte-
17  30=00:10:00"/>
18        <!-- Clip2 -->
19        <ref
20  src="urn:smpte:umid:060A2B34010101050101010D1213000000EDCBA9876543210F"
21  type="edlDoc" begin="smpte-30=00:10:00" clipBegin="smpte-30=00:00:00" clipEnd="smpte-
22  30=00:03:30:00"/>
23      </par>
24    </body>
25  </smil>
```

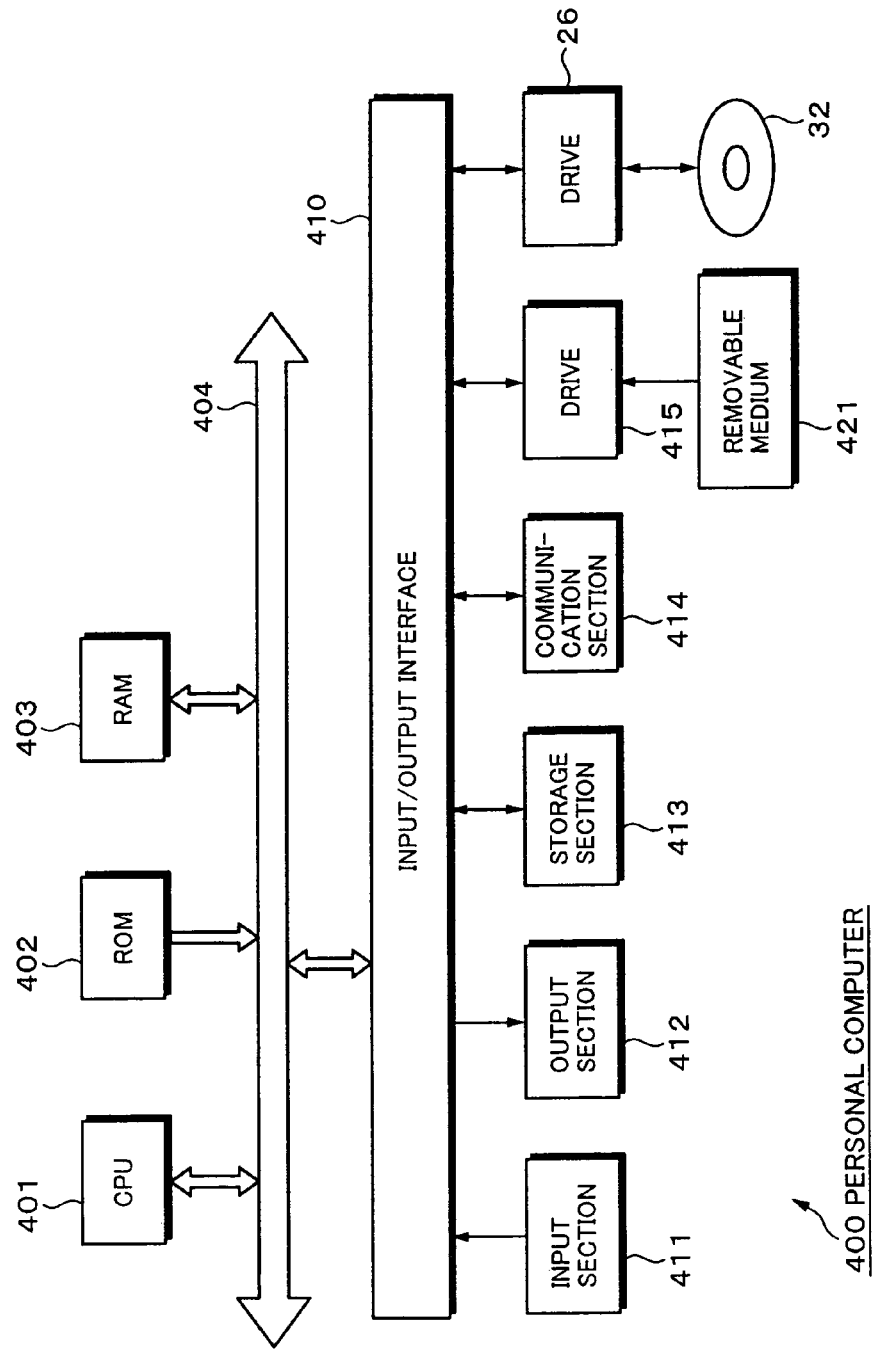

INFORMATION PROCESS APPARATUS AND METHOD, PROGRAM, AND RECORD MEDIUM

TECHNICAL FIELD

The present invention relates to an information process apparatus and method, a program, and a record medium, in particular, to those that allow a record process and a reproduction process to be more easily performed than before.

BACKGROUND ART

Conventionally, material data such as video data and audio data that are photographed and sound-recorded are recorded on a tape device such as a video tape that is a record medium. In recent years, as the information process technologies have been advanced, information has been digitized and discs such as DVD (Digital Versatile Disc) and so forth have been used as record mediums.

In these record mediums, material data are managed as files according to a file system such as UDF (Universal Disk Format). Thus, when material data are reproduced, a reproduction apparatus searches a record medium for a file of material data with a path name (hereinafter referred to as an absolute path name) and a file name under the root directory, reads the file from the record medium, and reproduces the file.

However, in this search method using an absolute path name and a file name, the absolute path name and the file name are used only for the local disc.

When an information process apparatus reads a file from an optical disc as a record medium loaded thereinto and records the file to an internal hard disk thereof, since the hard disk stores other information not recorded on the optical disc and the directory structure of the hard disk is different from that of the optical disc, the information process apparatus cannot access a file recorded on the hard disk with the same absolute path name and file name as those of the optical disc.

When a first file recorded on the optical disc references a second file different from the first file with an absolute path name and a file name, if the directory of the second file is changed the absolute path name of the second file described in the first file needs to be updated as the directory of the second path is changed. Otherwise, the first file cannot reference the second file.

In addition, when the information process apparatus reads the first file and the second file from the optical disc and records these files to the internal hard disc thereof, as described above, since the absolute path names of the first file and the second file recorded on the hard disc are different from those of the optical disc, unless the absolute path name of the second file described in the first file is updated, it cannot reference the second file.

If the first file references the second file with a path based on the position of the first file (hereinafter this path is referred to as a relative path name) and a file name and the information process apparatus records the first file and the second file to the hard disc so that the information process apparatus holds the relative path name, the first file can preference the second file. However, when the second file is moved to a different directory, the first file needs to be updated.

In contrast, a method that identifies material data (file) with a UMID (Unique Material IDentifier) is known. The UMID is a standardized identifier established by SMPTE (Society of Motion Picture and Television Engineers) and globally and uniquely identifies AV (Audio Visual) material or the like.

For example, a table that describes the relationship of path names and file names of files and UMIDs assigned to these files is recorded on an optical disc and a hard disk so that a UMID is converted into a path name and a file name. Thus, the information process apparatus can easily identify a file with a UMID in any directory structure.

When the first file references the second file with an UMID, since the relationship of path names, file names, and UMIDs are totally managed with the table, even if any file is moved, it can be easily identified only by updating the table.

However, since the foregoing UMID is an identifier that globally and uniquely identifies AV material or the like, even a basic UMID composed of basic information has a data amount of 32 bytes. The data amount of an extended UMID of which user information and so forth are added to the basic UMID becomes 64 bytes. This data amount is very large as an ID. Thus, when material data are identified with an UMID, the total data amount increases. In addition, the load for the process that identifies material data in the reproduction process and the record process becomes heavy.

DISCLOSURE OF THE INVENTION

The present invention is made from the above point of view and an object thereof is to improve convenience of a record medium so that for example a record process and a reproduction process can be more easily performed than before.

The present invention is an information process apparatus that manages data recorded on a record medium, comprising first generation means for generating management information that associates a first identifier that can identify the data in any area with information about the data; second generation means for generating a second identifier that can identify the data in a storage area of the record medium, the data amount of the second identifier being smaller than that of the first identifier; addition means for adding the second identifier generated by the second generation means to the management information to associate the second identifier with the information about the data; and record means for recording the management information to which the second identifier has been added by the addition means on the record medium.

The data may contain at least one of video data, audio data, and meta data added to the video data.

The information about the data may contain information about a directory path name and a file name of the data.

The first identifier may be composed of 64 bytes and the second identifier is composed of 20 bits.

The second identifier may be composed of a first portion that represents the type of the data and a second portion that represents a serial number of the second identifier.

The information process apparatus may further comprise search means for searching a plurality of second identifiers recorded on the record medium for the maximum value of the second portion, wherein the second generation means generates the second identifier according to the maximum value for which the search means has searched so that the second identifier does not become redundant to the plurality of second identifiers recorded on the record medium.

The information process apparatus may further comprise reproduction means for reading the data from the record medium and reproducing the data.

The information process apparatus may further comprise read means for reading the management information read by the record means; and hold means for holding the management information read by the read means, wherein the reproduction means reads the data to be reproduced from the record medium according to the management information read by the read means and held by the hold means and reproduces the data.

The present invention is an information process method for an information process apparatus that manages data recorded on a record medium, the method comprising the steps of generating management information that associates a first identifier that can identify the data in any area with information about the data; generating a second identifier that can identify the data in a storage area of the record medium, the data amount of the second identifier being smaller than that of the first identifier; adding the second identifier generated by a process of the second generation step to the management information to associate the second identifier with the information about the data; and controlling the recording of the management information to which the second identifier has been added by a process of the addition step on the record medium.

The present invention is a program that causes a computer to execute a process that reproduces data recorded on a record medium, the program comprising the steps of generating management information that associates a first identifier that can identify the data in any area with information about the data; generating a second identifier that can identify the data in a storage area of the record medium, the data amount of the second identifier being smaller than that of the first identifier; adding the second identifier generated by a process of the second generation step to the management information to associate the second identifier with the information about the data; and controlling the recording of the management information to which the second identifier has been added by a process of the addition step on the record medium.

The present invention is a record medium on which data reproduced by an information process apparatus are recorded, management information that associates a first identifier that can identify the data in any area and a second identifier that can identify the data in a storage area of the record medium, the data amount of the second identifier being smaller than that of the first identifier, with information about the data being recorded on the record medium.

In the information process apparatus and method, program, and record medium according to the present invention, management information that associates a first identifier that can identify the data in any area with information about the data is generated. A second identifier that can identify the data in a storage area of the record medium is generated. The data amount of the second identifier being smaller than that of the first identifier. The generated second identifier is added to the management information to associate the second identifier with the information about the data. The management information to which the second identifier has been added is recorded on the record medium.

BRIEF DESCRIPTION OF DRAWINGS

FIG. 7 is a schematic diagram showing an example of an XML description of an index file;

FIG. 8 is a schematic diagram showing an example of an XML description of the index file as a part preceded by FIG. 7;

FIG. 9 is a schematic diagram showing an example of an XML description of the index file as a part preceded by FIG. 8;

FIG. 10 is a schematic diagram showing an example of an XML description of the index file as a part preceded by FIG. 9;

FIG. 11 is a schematic diagram showing an example of an XML description of a disc information file;

FIG. 16 is a flow chart describing a clip addition process;

FIG. 17 is a schematic diagram showing an example of an XML description of a clip information file;

FIG. 18 is a schematic diagram showing an example of an XML description of the clip information file as a part preceded by FIG. 17;

FIG. 20 is a schematic diagram showing an example of an XML description of an edit list file;

FIG. 30 is a block diagram showing an example of the structure of a computer according to an embodiment of the present invention.

BEST MODES FOR CARRYING OUT THE INVENTION

Figure 1:
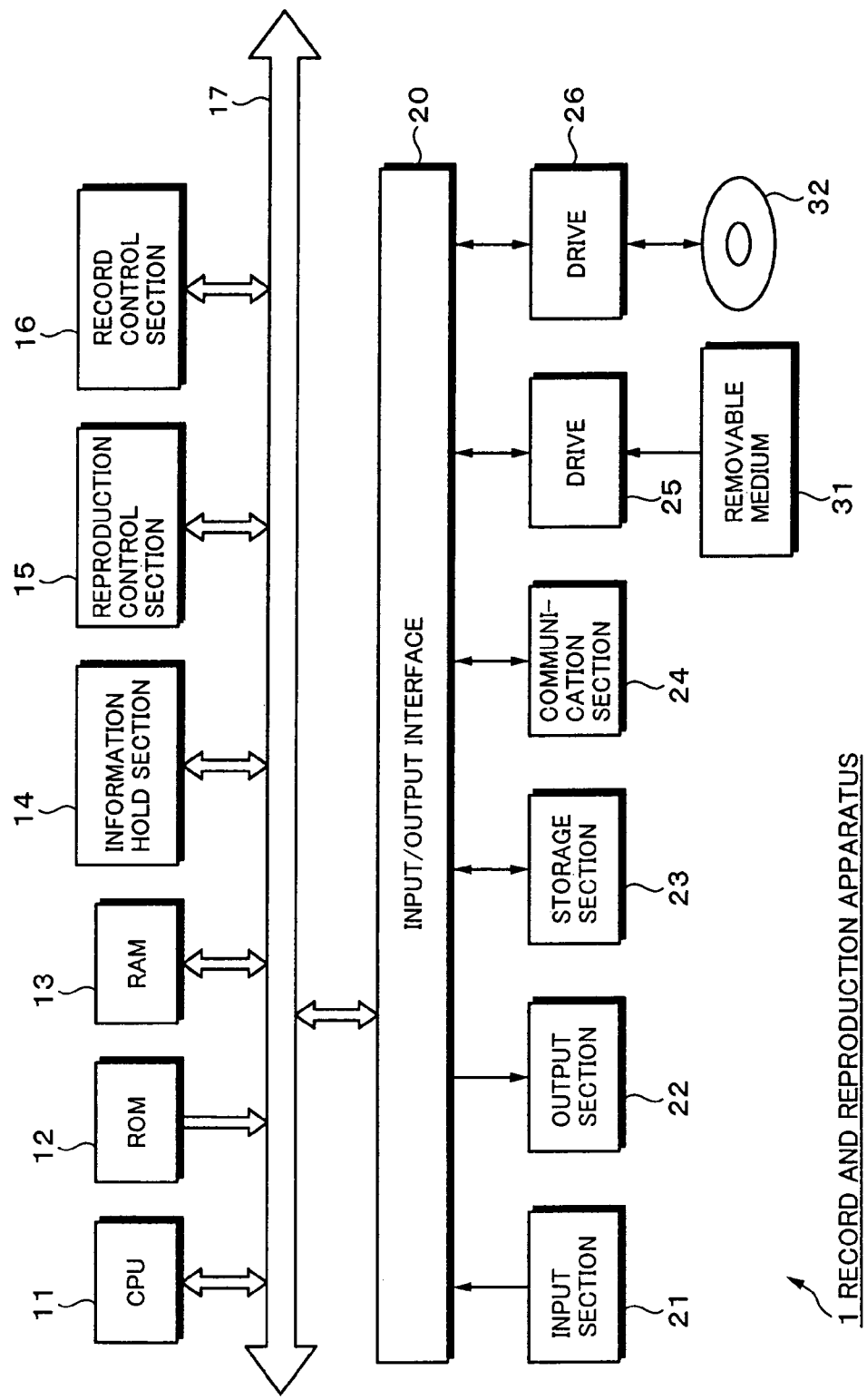
FIG. 1 is a schematic diagram showing an example of the structure of a record and reproduction apparatus according to the present invention.

Next, embodiments of the present invention will be described. The relationship between the structural elements described in the claims and the embodiments of the present patent application is as follows. This relationship represents that examples that support the claims of the present patent application are described in the embodiments of the present patent application. Thus, even if examples corresponding to the embodiments are not described in this section, the examples should not be construed as those that do not correspond to the structural elements of the claims of the present patent application. In contrast, even if examples are described in this section as those that correspond to the structural elements of the claims, the examples should not be construed as those that do not correspond to other than the structural elements of the claims of the present patent application.

In addition, the description of this section does not mean that all aspects of the present invention that correspond to the examples described in the embodiments of the present patent application are not described in the claims of the present patent application. In other words, this description does not deny the possibility of which there are aspects of the present invention that are described in the embodiments but not described in the claims of the present patent application, namely aspects of the present invention that may be filed as divisional patent application(s) or aspects of the present invention that may be added as amendments.

Figure 4:
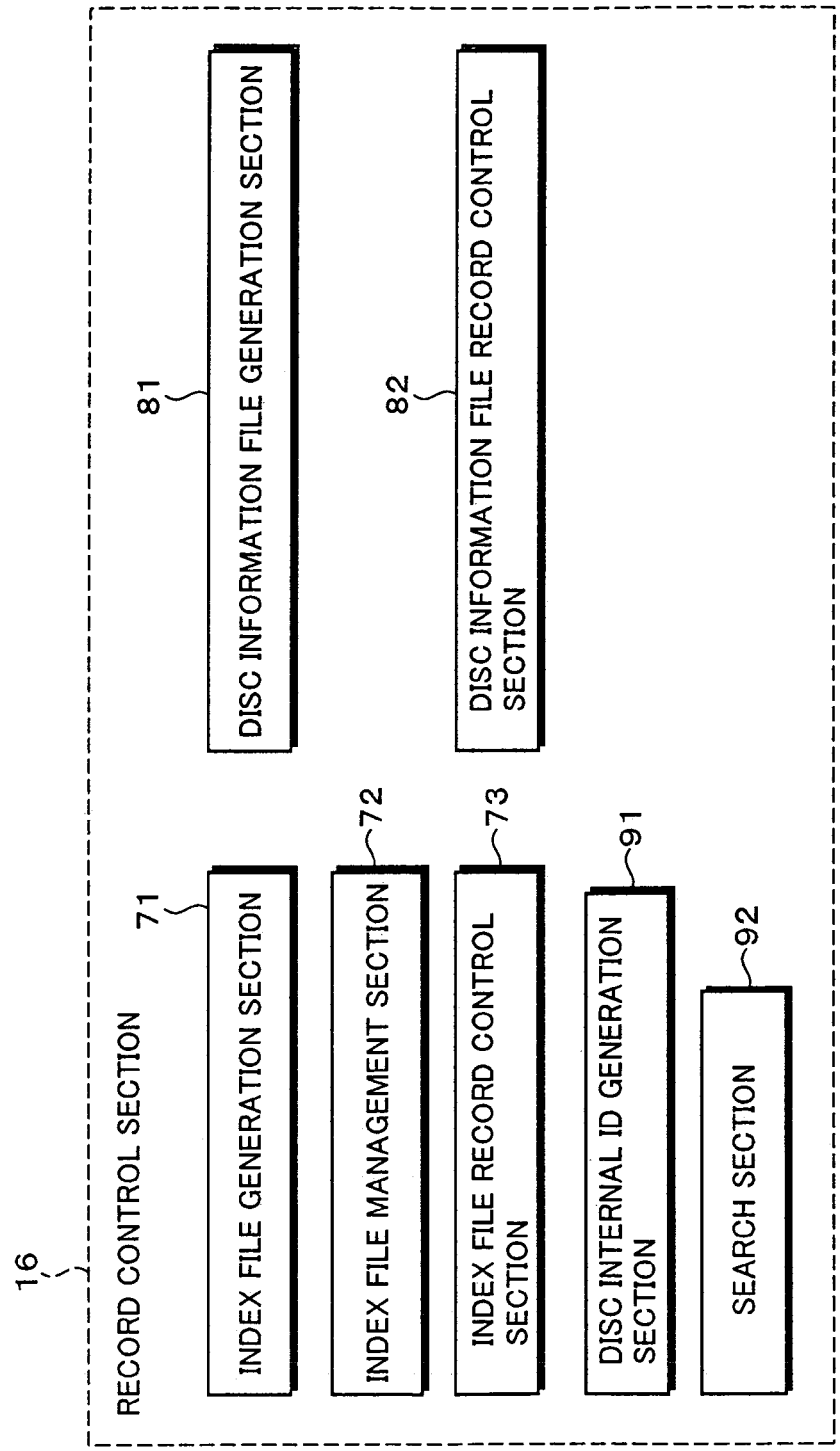
FIG. 4 is a block diagram showing an example of the detailed structure of a record control section shown in FIG. 1.

[Claim 1] An information process apparatus (for example, a record and reproduction apparatus 1 shown in FIG. 1) that manages data (for example, a video data file 222 shown in FIG. 13) recorded on a record medium (for example, a disc 32 shown in FIG. 1), comprising:

first generation means (for example, an index file generation section 71 shown in FIG. 4) for generating management information (for example, an index file 204 shown in FIG. 12) that associates a first identifier (for example, a UMID described in line 6, FIG. 7) that can identify the data in any area with information (for example, a directory path described in line 4, FIG. 7 and a file name described in line 7, FIG. 7) about the data;

second generation means (for example, a disc internal ID generation section 91 shown in FIG. 4) for generating a second identifier (for example, a disc internal ID described in line 6, FIG. 7) that can identify the data in a storage area of the record medium, the data amount of the second identifier being smaller than that of the first identifier;

addition means (for example, an index file management section 72, shown in FIG. 4, that executes a process at step S57 shown in FIG. 16) for adding the second identifier generated by the second generation means to the management information to associate the second identifier with the information about the data; and record means (for example, an index file record control section 73 shown in FIG. 4) for recording the management information to which the second identifier has been added by the addition means on the record medium.

Figure 13:
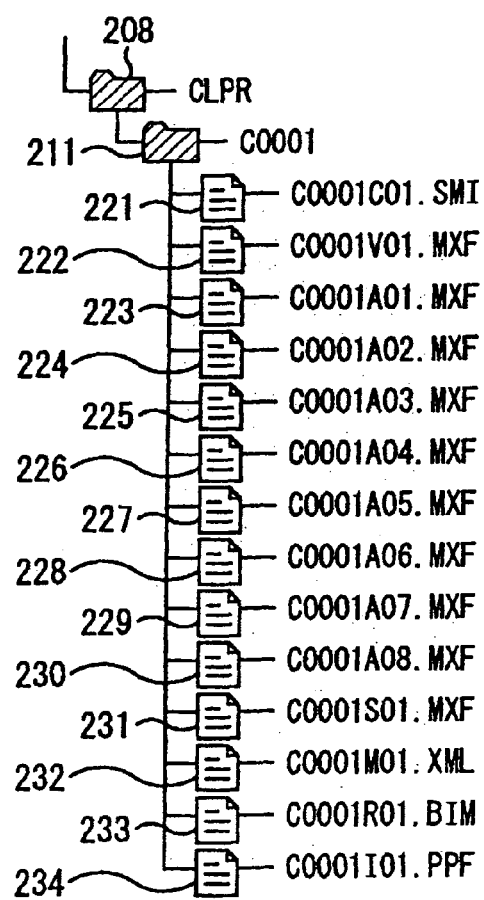
FIG. 13 is a schematic diagram showing an example of the more detailed directory structure of the directory structure shown in FIG. 4.

[Claim 2] The information process apparatus as set forth in claim 1, wherein the data contain at least one of video data (for example, a video data file 222 or a low resolution data file 231 shown in FIG. 13), audio data (for example, audio data files 223 to 230 shown in FIG. 13), and meta data (for example, a frame meta data file 233 shown in FIG. 13) added to the video data.

[Claim 3] The information process apparatus as set forth in claim 1, wherein the information about the data contains information about a directory path name (for example, a description in line 4, FIG. 7) and a file name (for example, a description in line 7, FIG. 7) of the data.

[Claim 4] The information process apparatus as set forth in claim 1, wherein the first identifier is composed of 64 bytes and the second identifier is composed of 20 bits.

[Claim 5] The information process apparatus as set forth in claim 1, wherein the second identifier is composed of a first portion (for example, portion [C] of disc internal ID [C0001] described in line 6, FIG. 7) that represents the type of the data and a second portion (for example, portion [0001] of disc internal ID [C0001] described in line 6, FIG. 7) that represents a serial number of the second identifier.

[Claim 6] The information process apparatus as set forth in claim 5, further comprising:

search means (for example, a search section 92 shown in FIG. 4) for searching a plurality of second identifiers recorded on the record medium for the maximum value (for example, maximum value [3] in FIG. 12) of the second portion, wherein the second generation means generates the second identifier according to the maximum value for which the search means has searched so that the second identifier does not become redundant to the plurality of second identifiers recorded on the record medium (for example, at step S56 shown in FIG. 16).

[Claim 7] The information process apparatus as set forth in claim 1, further comprising:

reproduction means (for example, a reproduction control section 15 shown in FIG. 1) for reading the data from the record medium and reproducing the data.

[Claim 8] The information process apparatus as set forth in claim 7, further comprising:

read means (for example, an index file read section 61 shown in FIG. 3) for reading the management information read by the record means; and hold means (for example, an index file hold section 51 shown in FIG. 2) for holding the management information read by the read means, wherein the reproduction means reads the data to be reproduced from the record medium according to the management information read by the read means and held by the hold means and reproduces the data.

Figure 6:
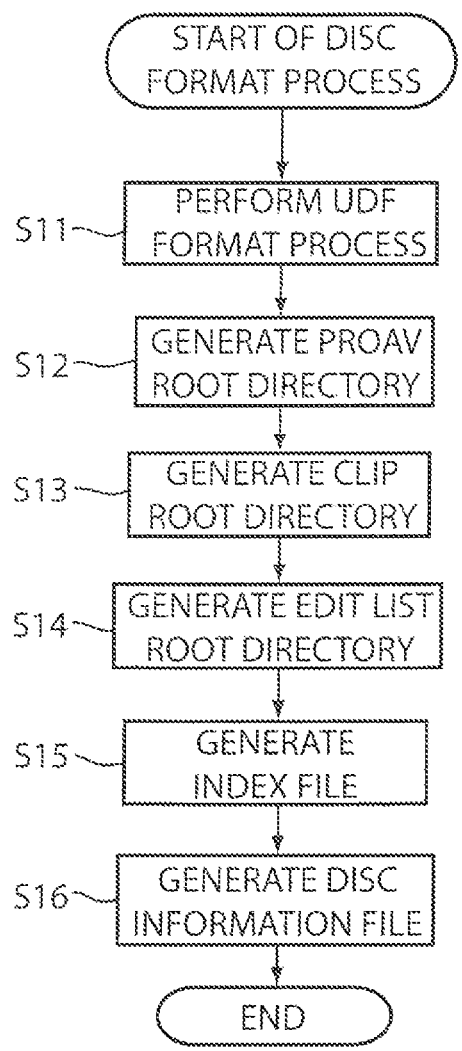
FIG. 6 is a flow chart describing a disc format process.

[Claim 9] An information process method for an information process apparatus (for example, a record and reproduction apparatus 1 shown in FIG. 1) that manages data (for example, a video data file 222 shown in FIG. 13) recorded on a record medium (for example, a disc 32 shown in FIG. 1), the method comprising the steps of:

generating management information (for example, an index file 204 shown in FIG. 12) that associates a first identifier (for example, a UMID described in line 6, FIG. 7) that can identify the data in any area with information (for example, a directory path described in line 4, FIG. 7 and a file name described in line 7, FIG. 7) about the data (for example, at step S15 shown in FIG. 6);

generating a second identifier (for example, a disc internal ID described in line 6, FIG. 7) that can identify the data in a storage area of the record medium, the data amount of the second identifier being smaller than that of the first identifier (for example, at step S56 shown in FIG. 16);

adding the second identifier generated by a process of the second generation step to the management information to associate the second identifier with the information about the data (for example, at step S57 shown in FIG. 16); and controlling the recording of the management information to which the second identifier has been added by a process of the addition step on the record medium (for example, at step S58 shown in FIG. 16).

[Claim 10] A program that causes a computer (for example, a personal computer 400 shown in FIG. 30) to execute a process that reproduces data (for example, a video data file 222 shown in FIG. 13) recorded on a record medium (for example, a disc 32 shown in FIG. 1), the program comprising the steps of:

generating management information (for example, an index file 204 shown in FIG. 12) that associates a first identifier (for example, a UMID described in line 6, FIG. 7) that can identify the data in any area with information (for example, a directory path described in line 4, FIG. 7 and a file name described in line 7, FIG. 7) about the data (for example, at step S15 shown in FIG. 6);

generating a second identifier (for example, a disc internal ID described in line 6, FIG. 7) that can identify the data in a storage area of the record medium, the data amount of the second identifier being smaller than that of the first identifier (for example, at step S56 shown in FIG. 16);

adding the second identifier generated by a process of the second generation step to the management information to associate the second identifier with the information about the data (for example, at step S57 shown in FIG. 16); and controlling the recording of the management information to which the second identifier has been added by a process of the addition step on the record medium (for example, at step S58 shown in FIG. 16).

[Claim 11] A record medium (for example, a disc 32 shown in FIG. 1) on which data (for example, a video data file 222 shown in FIG. 13) reproduced by an information process apparatus (for example, a record and reproduction apparatus 1 shown in FIG. 1) are recorded, management information (for example, an index file 204 shown in FIG. 12) that associates a first identifier (for example, a UMID described in line 6, FIG. 7) that can identify the data in any area and a second identifier (for example, a disc internal ID described in line 6, FIG. 7) that can identify the data in a storage area of the record medium, the data amount of the second identifier being smaller than that of the first identifier, with information (for example, a directory path described in line 4, FIG. 7 and a file name described in line 7, FIG. 7) about the data being recorded on the record medium.

Next, with reference to the accompanying drawings, an embodiment of the present invention will be described.

FIG. 1 is a block diagram showing an example of the structure of a record and reproduction apparatus according to the present invention.

In FIG. 1, a record and reproduction apparatus 1 is an apparatus that records material data such as video data, audio data, and so forth on a disc 32 loaded into a drive 26 and reproduces material data from the disc 32. A CPU (Central Processing Unit) 11 of the record and reproduction apparatus 1 executes various processes according to a program stored in a ROM (Read Only Memory) 12. When necessary, a RAM (Random Access Memory) 13 stores data, programs, and so forth that the CPU 11 uses to execute various processes.

An information hold section 14 is a storage section that is composed of a semiconductor memory or the like that temporarily stores information. The information hold section 14 holds information about material data read from a disc 32 and recorded thereon. The information hold section 14 is controlled by a reproduction control section 15, a record control section 16, and so forth so that the information hold section 14 provides its held information and obtains new information.

A reproduction control section 15 controls a drive 26 through a bus 17 and an input/output interface 20 to perform a process that controls the drive 26 to read various types of information from the disc 32 loaded into the drive 26. For example, the reproduction control section 15 executes a control process that reads management information about data recorded on the disc 32 and supplies the management information to the information hold section 14. In addition, the reproduction control section 15 executes a reproduction process for video data, audio data, and so forth read from the disc 32. The record control section 16 controls the drive 26 through the bus 17 and the input/output interface 20 to perform a process that controls writing of various types of information on the disc 32 loaded into the drive 26. For example, the record control section 16 executes a control process that for example records data held in the information hold section 14 on the disc 32.

The CPU 11, the ROM 12, the RAM 13, the information hold section 14, the reproduction control section 15, and the record control section 16 are mutually connected through the bus 17. In addition, the input/output interface 20 is also connected to the bus 17.

Connected to the input/output interface 20 is an input section 21 composed of a keyboard and a mouse. A signal that is input to the input section 21 is output to the CPU 11. Connected to the input/output interface 20 is also an output section 22 composed of a display device, a speaker, and so forth.

Connected to the input/output interface 20 are also a storage section composed of a hard disk, an EEPROM (Electronically Erasable and Programmable Read Only Memory), and so forth and a communication section 24 that communicate with another device through a non-wireless network, a wireless network, or the like. The drive 25 is used to read a program or data necessary to execute a program from a removable medium 31 composed of a record medium such as a magnetic disc, an optical disc, an optical-magnetic disc, a semiconductor memory, or the like and write data and a program thereon.

The drive 26 reads material data such as video data, audio data, and so forth from the disc 32 loaded thereinto and records material data on the disc 32 loaded thereinto.

The disc 32 is an optical disc on which a large capacity of data (for example, 27 Gigabytes) having a mark length of 0.14 μm (minimum) and a track pitch of 0.32 μm is recorded with a blue-purple laser having a numerical aperture (NA) of 0.85 and a wavelength of 405 nm. The disc 32 may be another type of a record medium. For example, the disc 32 may be one of various types of optical discs such as DVD-RAM (Digital Versatile Disc-Random Access Memory), DVD-R (DVD-Recordable), DVD-RW (DVD-ReWritable), DVD+R (DVD+Recordable), DVD+RW (DVD+ReWritable), CD-R (Compact Disc-Recordable), CD-RW (CD-ReWritable), and so forth.

Figure 2:
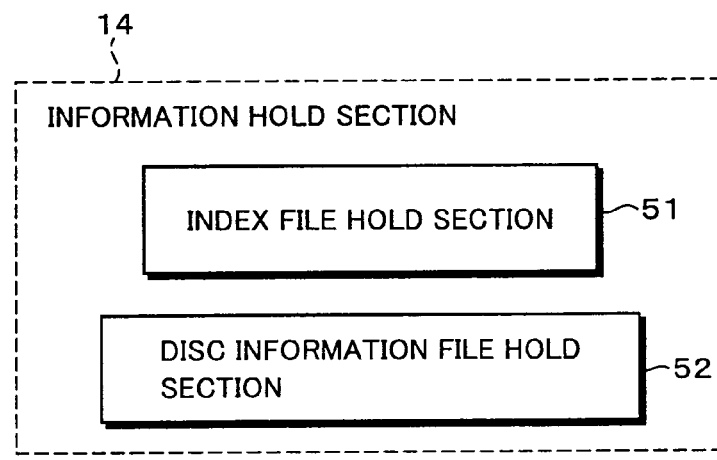
FIG. 2 is a block diagram showing an example of the detailed structure of an information hold section shown in FIG. 1.

FIG. 2 is a block diagram showing an example of the detailed structure of the information hold section 14 shown in FIG. 1. In FIG. 2, the information hold section 14 has an index file hold section 51 that holds an index file that manages information recorded on the disc 32 and a disc information file hold section 52 that holds a disc information file that contains reproduction history of video data and audio data recorded on the disc 32. The information hold section 14 can also hold other information besides the foregoing information.

Figure 3:
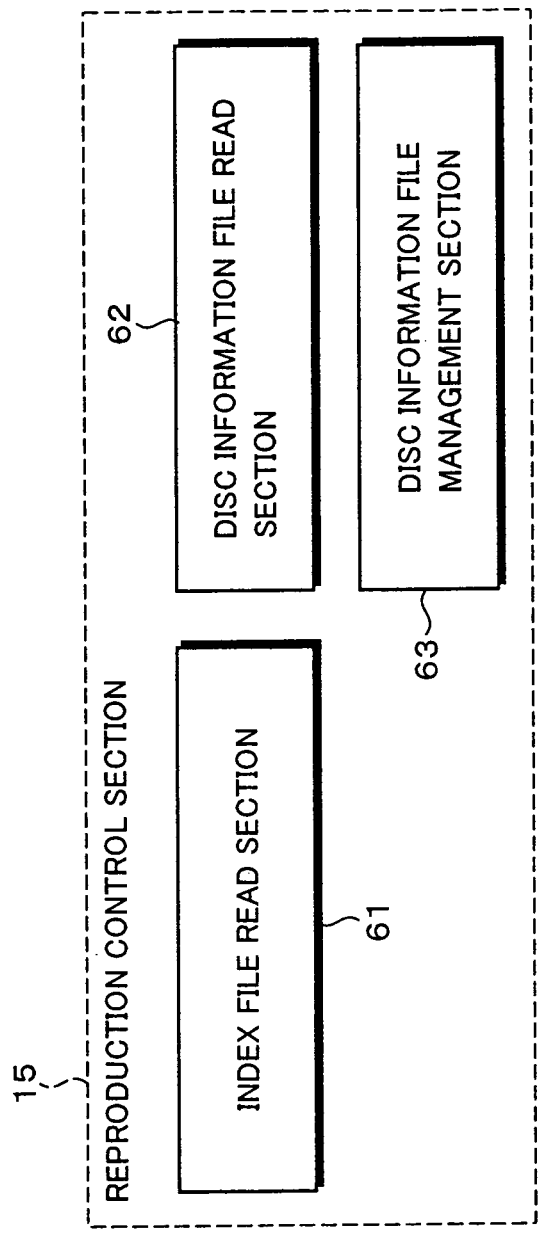
FIG. 3 is a block diagram showing an example of the detailed structure of a reproduction control section shown in FIG. 1.

FIG. 3 is a block diagram showing an example of the detailed structure of the reproduction control section 15 shown in FIG. 1. In FIG. 3, the reproduction control section 15 has an index file read section 61 that executes a process that reads the index file from the disc 32 loaded into the drive 26 and causes the index file hold section 51 shown in FIG. 2 to hold the index file, a disc information file read section 62 that performs a process that reads the disc information file from the disc 32 loaded into the drive 26 and causes the disc information file 52 shown in FIG. 2 to hold the disc information file, and a disc information file management section 63 that performs a process that manages the disc information file read from the disc 32 and held in the disc information file hold section 52. The reproduction control section 15 controls the drive 26 to read material data such as video data, audio data, and so forth from the disc 32 loaded into the drive 26 and reproduce the material data. In addition, the reproduction control section 15 controls the index file read section 61 and the disc information file read section 62 to read data other than the material data. Moreover, the reproduction control section 15 controls the disc information file management section 63 to manage these data that have been read and hold.

FIG. 4 is a block diagram showing an example of the detailed structure of the record control section 16 shown in FIG. 1. In FIG. 4, the record control section 16 has an index file generation section 71 that performs a process that generates the index file, an index file management section 72 that manages the index file held in the index file hold section 51, an index file record control section 73 that records the index file held in the index file hold section 51 on the disc 32 loaded into the drive 26, a disc information file generation section 81 that generates the disc information file and causes the disc information file hold section 52 to hold the disc information file, a disc information file record control section 82 that executes a process that records the disc information file held in the disc information file hold section 52 on the disc 32, a disc internal ID generation section 91 that generates a disc internal ID managed with the index file, and a search section 92 that searches the disc 32 for a file. The record control section 16 controls the drive 26 to execute a process that records material data such as video data, audio data, and so forth on the disc 32 loaded into the drive 26. In addition, the record control section 16 executes a process that causes the index file generation section 71 to generate the index file, the index file management section 72 to manage the index file held in the index file hold section 51, and the drive 26 to record the index file held in the index file hold section 51 on the disc 32, a disc internal ID managed with the index file to be generated, and the disc 32 to be searched for a file with a disc internal ID.

Figure 5:
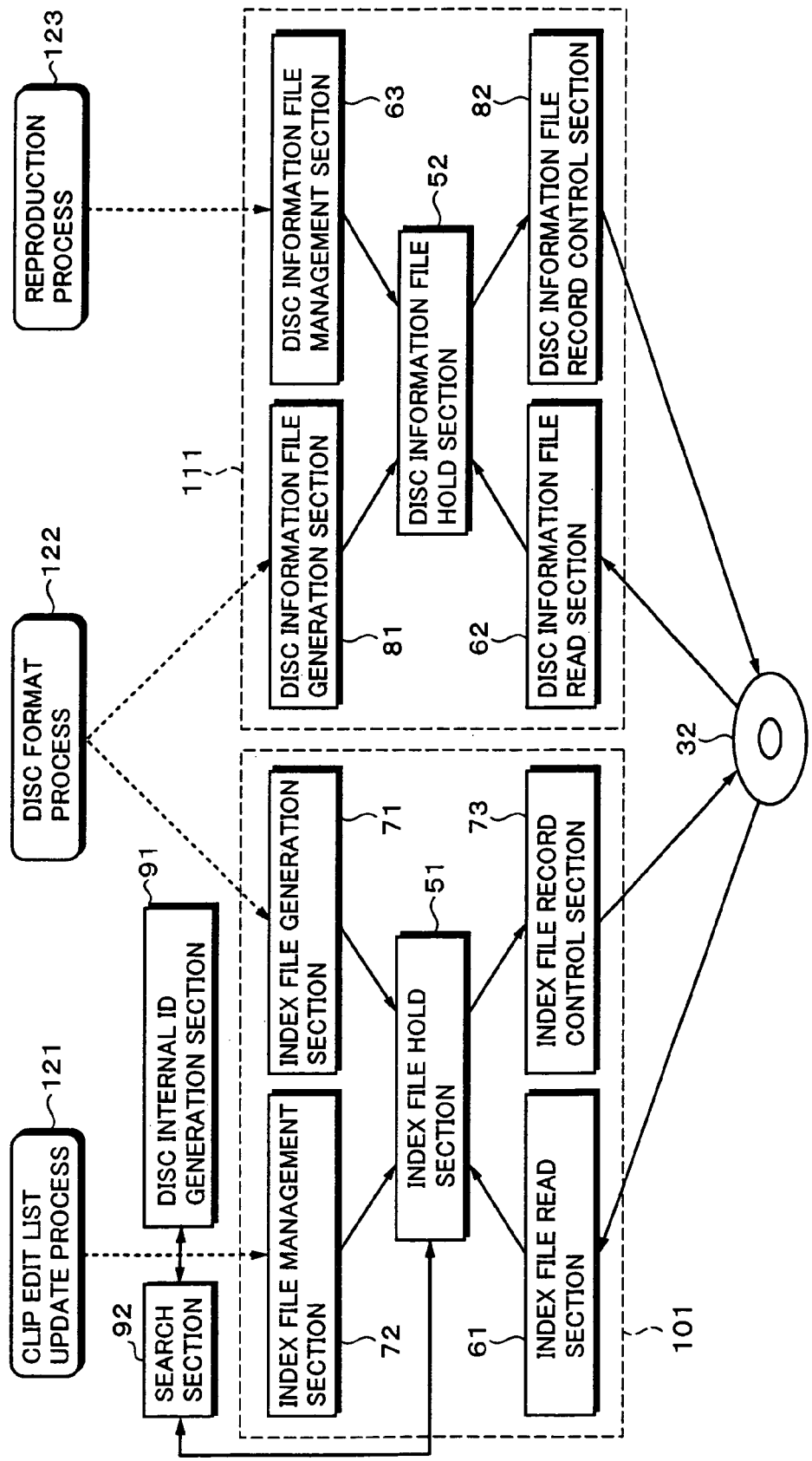
FIG. 5 is a functional block diagram showing the relationship of processes that individual sections shown in FIG. 2 to FIG. 4 perform.

Next, with reference to a block diagram shown in FIG. 5, the relationship of functions of individual sections described with reference to FIG. 2 to 4 will be described. FIG. 5 shows the relationship of the main process that the record and reproduction apparatus 1 shown in FIG. 1 executes and the functions of the individual sections.

An index process section 101 that performs a process for the index file is composed of the index file hold section 51, the index file read section 61, the index file generation section 71, the index file management section 72, and the index file record control section 73. The index file management section 72 may perform the process in association with the disc internal ID generation section 91 and the search section 92.

When a disc format process 122 is executed and a format process for the disc 32 is started, the index file generation section 71 generates the index file, which contains management information of files recorded on the disc 32. The generated index file is supplied to the index file record control section 73 through the index file hold section 51 and recorded on the disc 32 loaded into the drive 26.

When the disc 32 on which video data, audio data, and so forth are recorded is loaded into the drive 26, the index file read section 61 reads the index file from the disc 32 and causes the index file hold section 51 to hold the index file.

When a clip edit list update process 121 that updates video data and audio data recorded on the disc 32 is executed, the index file management section 72 manages and updates the index file held in the index file hold section 51 as the video data and audio data are updated. At this point, the search section 92 searches the index file for the maximum value of the disc internal ID assigned to a clip or an edit list contained in the index file. The disc internal ID generation section 91 generates a disc internal ID according to the maximum value. The index file management section 72 updates the index file with the generated disc internal ID generated by the disc internal ID generation section 91.

Specifically, when a clip or an edit list is added, the index file management section 72 causes the disc internal ID generation section 91 to generate a disc internal ID corresponding to the clip or edit list to be added and obtains the generated the disc internal ID. At this point, the disc internal ID generation section 91 decides the value of the disc internal ID corresponding to the maximum value of the disc internal ID for which the search section 92 has searched and generates the disc internal ID that has the value.

The index file management section 72 associates the obtained disc internal ID with the absolute path name, the file name, and the UMID (Unique Material IDentifier) of the clip or edit list to be added and assigns the disc internal ID to the clip or edit list. In addition, the index file management section 72 adds information about the clip or edit list to which the disc internal ID has been assigned to the index file.

The index file record control section 73 reads the updated index file from the index file hold section 51 and records the index file on the disc 32.

A clip is a unit that represents the number of times of a photographing process. Instead, a clip may be a unit that represents the duration after the photographing process starts until it stops. Instead, a clip may be a unit that represents the length of one of various types of data obtained in the photographing process. Instead, a clip may be a unit that represents a data amount of one of various types of data obtained in the photographing process. Instead, a clip may be a set of various types of data.

A disc information process section 111 that performs a process for the disc information file is composed of the disc information file hold section 52, the disc information file read section 62, the disc information file generation section 81, the disc information file management section 63, and the disc information file record control section 82.

When the disc format process 122 is executed and the format process for the disc 32 is started, the disc information file generation section 81 generates the disc information file, which contains a reproduction history of material data of video data, audio data, and so forth recorded on the disc 32. The generated disc information file is supplied to the disc information file record control section 82 through the disc information file hold section 52 and recorded on the disc 32 loaded into the drive 26.

When the disc 32 on which video data, audio data, and so forth are recoded is loaded into the drive 26, the disc information file read section 62 reads the disc information file from the disc 32 and causes the disc information file hold section 52 to hold the disc information file.

When a reproduction process 123 that reproduces material data recorded on the disc 32 is executed, the reproduction control section 15 references the reproduction history of the disc information file, which is held in the disc information file hold section 52, and starts reproducing material data from the position according to the reproduction history. At this point, the reproduction control section 15 obtains material data with the disc internal ID described in the disc information file. Specifically, the reproduction control section 15 references the index file, obtains the absolute path name and file name corresponding to the disc internal ID, and accesses material data corresponding to the information.

When the reproduction control section 15 has completed the reproduction process, the disc information file management section 63 updates the reproduction history of the disc information file held in the disc information file hold section 52. The disc information file record control section 82 reads the updated disc information file from the disc information file hold section 52 and records the file on the disc 32.

As described above, according to each operation command, individual sections cooperatively perform processes and operations.

These processes assign a disc internal ID associated with the absolute path name, the file name, and UMID of the clip or edit list thereto.

The disc internal ID is an ID that can be used only in the disc 32 (namely, unique in the disc 32). It is expected that data amount assigned for disc internal IDs is much smaller than that for the UMIDS. Thus, the data amount of UMIDs is much smaller than that of the disc internal IDs. As a result, since the record and reproduction apparatus 1 can designate a file with a disc internal ID only by referencing the index file, the total data amount of disc internal IDs can be decreased in comparison with that of the UMIDs. In addition, the load of the process that designates material data in the reproduction process and the record process can be lightened.

In addition, the absolute path names, file names, UMIDs, and disc internal IDs of clips or edit lists are associated in the index file. Thus, when a clip or an edit list is read from the disc 32 and the clip or the edit list is recorded to an external device of the disc 32, for example the information hold section 14 or the storage section, with reference to the index file recorded on the disc 32, the record and reproduction apparatus 1 can obtain information of the UMID of the clip or edit list and manage the clip or the edit list with the UMID.

In other words, the record and reproduction apparatus 1 can reference a clip or an edit list recorded on the disc 32 with a disc internal ID. The record and reproduction apparatus 1 can reference a clip or an edit list recorded on external device with a UMID. Thus, the versatility of the reference method for a clip or an edit list can be maintained.

Next, a specific flow of each of the foregoing processes will be described.

When the user operates the input section 21 or the like and designates the format process for the disc 32 loaded into the drive 26, individual sections of the record and reproduction apparatus 1 shown in FIG. 1 start the disc format process.

Next, with reference to a flow chart shown in FIG. 6, the disc format process will be described.

Firstly, at step S11, the record control section 16 executes a UDF (Universal Disk Format) format process for the disc 32 loaded into the drive 26 to perform a logical format process according to UDF. Thereafter, the flow advances to step S12. At step S12, the record control section 16 generates a ProAV directory under the root directory according to UDF on the disc 32 and records the ProAV directory on the disc 32. At step S13, the record control section 16 generates a clip root directory that contains files of material data of video data, audio data, and so forth and files of information about the material data and so forth under the ProAV directory and records the clip root directory on the disc 32. At step S14, the record control section 16 generates an edit root directory under the ProAV directory. The edit root directory contains an edit result (edit information) of which a clip that is a file group of material data and so forth, which are placed under the clip root directory, has been non-destructively edited. The record control section 16 records the edit root directory on the disc 32.

At step S15, the index file generation section 71 of the record control section 16 generates the index file, which totally manages file names (including absolute paths), UMIDs, and disc internal IDs of clips or edit lists, according to XML (extensible Markup Language) and causes the index file hold section 51 to hold the index file. The index file record control section 73 records the index file held in the index file hold section 51 on the disc 32. Thereafter, the flow advances to step S16.

At step. S16, the disc information file generation section 81 of the record control section 16 generates the disc information file, which references a clip or an edit list with a disc internal ID, according to XML and causes the disc information file hold section 52 to hold the disc information file. The disc information file record control section 82 records the disc information file held in the disc information file hold section 52 on the disc 32. Thereafter, the record control section 16 completes the disc format process.

FIG. 7 to FIG. 10 show a specific example of a description of the index file that totally manages file names (including absolute path names), UMIDs, and disc internal IDs of clips and edit lists. In FIG. 7 to FIG. 10, numerals that start with individual lines are added for convenience for explanation, not part of an XML description.

As described above, the index file is a file that manages information about files recorded on the disc 32. Specifically, the index file manages information of files under the ProAV directory generated at step S12 shown in FIG. 6. Information about these files is described from a start tag, line 2, FIG. 7 to an end tag, line 16, FIG. 10.

Clips contained under the clip directory are described as a clip table from a start tag, line 4, FIG. 7 to an end tag, line 24, FIG. 9. As shown in FIG. 7 to FIG. 9, in this case, four clips are contained under the clip root directory. A first clip is described from line 5, FIG. 7 to line 23, FIG. 7. A second clip is described from line 24, FIG. 7 to line 13, FIG. 8. A third clip is described from line 14, FIG. 8 to line 3, FIG. 9. A fourth clip is described from line 4, FIG. 9 to line 23, FIG. 9.

Line 6 and line 7, FIG. 7, describe information about a clip information file that manages information about each file of the first clip. For example, [id="C0001"], line 6, FIG. 7 represents that the disc internal ID assigned to this clip is [C0001]. In this case, each digit of the disc internal ID is denoted in hexadecimal notation. The disc internal ID is composed of a total of 20 bits of a portion [C] that represents a clip of four bits and a four-digit serial number portion [0001] of 16 bits. In other words, disc internal IDs of clips are generated so that the value of the serial number portion is incremented by one for example [C0001], [C0002], [C0003], and so forth. The disc internal IDs are assigned to individual clips so that they do not become redundant to the other disc internal IDs.

The disc internal IDs may be in any format other than the foregoing format. Thus, the data amount of a disc internal ID may have any value. However, if the data amount of a disc internal ID is too large, like a UMID, the load of the process that designates material data becomes large. In contrast, if the data amount of a disc internal ID is too small, the number of clips that can be assigned becomes too small. Thus, there will be a possibility of which disc internal IDs are redundant.

[umid="0D1213000000000001044444484EEEE00E01 88E130B"], line 6, FIG. 7, represents that the UMID of the first clip is [0D1213000000000001044444484EE EE00E0188E130B]. In this example, each digit of the UMID is denoted in hexadecimal notation. There are two type of UMIDs that are a basic UMID of 32 bytes and an extended UMID of 64 bytes of which user information (source pack) of 32 bytes is added to the basic UMID. In the index file, a basic UMID of 32 bytes is used. FIG. 7 also shows a part of a basic UMID (22 bytes (44 characters) of which 10 bytes are omitted from the universal label portion). Of course, for the index file, an extended UMID of 64 bytes may be used.

[path="/PROAV/CLPR"], line 4, FIG. 7, represents the absolute path of the clip table. [file="C0001C01.SMI"], line 7, represents the file name of the clip information file. Since the clip information file describes information about a reproduction method and procedure of material data contained in the first clip, the record and reproduction apparatus 1 can reproduce the first clip by designating the absolute path described in line 4, and the file name described in line 7.

Line 6 describes a disc internal ID assigned to the first clip. Thus, the record and reproduction apparatus 1 can reproduce the first clip by designating disc internal ID [C0001].

In addition, line 6 describes a UMID assigned to the first clip. Thus, the record and reproduction apparatus 1 can reproduce the first clip by designating the UMID.

After the description of the clip information file, information about video data of the first clip is described from line 8 and line 9, FIG. 7. Information about individual channels of audio data is described from line 10 to line 17, FIG. 7.

Information about a sub stream that is material data composed of low resolution video data and audio data corresponding to the foregoing video data and audio data is described from line 18 to line 19, FIG. 7. Information about clip meta data as meta data added to a clip is described in line 20 and line 21, FIG. 7. Information about frame meta data added to each frame of video data of this clip is described in line 22, FIG. 7.

As shown in FIG. 7, these files describe file names and UMIDs. Thus, these files can be designated with file names and UMIDs.

Likewise, in the second to fourth clips, file names (including absolute path names), disc internal IDs, and UMIDs are associatively described. For simplicity, their description will be omitted.

In the index file, the file name (including the absolute path name) of the clip information file of each clip recorded on the disc 32 is associated with a disc internal ID and a UMID. Thus, the record and reproduction apparatus 1 can designate a clip information file of a clip recorded on the disc 32 with a disc internal ID whose data amount is small. Thus, the record and reproduction apparatus 1 can read and reproduce material data of a clip with a lighter load than the case of which a UMID is used.

In addition, since the file name (including the absolute path name) of the clip information file of the clip and a UMID can be associated in the index file, even if the clip exists outside the disc 32, when a table that associates a new file name (including an absolute path name) with a UMID is provide, the record and reproduction apparatus 1 can read and reproduce material data of the clip.

In addition, edit lists contained under the edit list root directory are described as an edit list table from a start tag, line 25, FIG. 9 to an end tag, line 15, FIG. 10. As shown in FIG. 7 to FIG. 10, in this case, four edit lists are contained under the edit list root directory. A first edit list is described from line 26, FIG. 9 to line 1, FIG. 10. A second edit list is described from line 2, FIG. 10 to line 5, FIG. 10. A third edit list is described from line 6, FIG. 10 to line 9, FIG. 10. A fourth edit list is described from line 10, FIG. 10 to line 14, FIG. 10.

For example, line 26 and line 27, FIG. 9, describe information about an edit list file that manages information about each file of the first edit list. For example, [id="E0001"], line 26, FIG. 9 represents that the disc internal ID assigned to this edit list is [E0001]. In this case, the disc internal ID is composed of a portion [E] that represents a edit list and a four-digit serial number portion [0001] of 16 bits. In other words, disc internal IDs of clips are generated so that the value of the serial number portion is incremented by one for example [E0001], [E0002], [E0003], and so forth. The disc internal IDs are assigned to individual edit lists so that they do not become redundant to the other disc internal IDs.

The disc internal IDs may be in any format other than the foregoing format. Thus, the data amount of a disc internal ID may have any value. However, if the data amount of a disc internal ID is too large, like a UMID, the load of the process that designates material data becomes large. In contrast, if the data amount of a disc internal ID is too small, the number of edit lists that can be assigned becomes too small. Thus, there will be a possibility of which disc internal IDs are redundant.

After the disc internal ID, line 26, FIG. 9, [umid="0D12130000000000001044444484EEEE00E0188E130B"] represents that the UMID of the first edit list described in line 26 and line 27, FIG. 9, is [0D12130000000000001044444484EEEE00E0188E130B]. In this example, the UMID is denoted in hexadecimal notation. In addition, this UMID is an extended UMID of which a part (10 bits) of a universal label of a basic UMID is omitted. This UMID is composed of a total of 22 bytes (44 characters in FIG. 7).

[path="/PROAV/EDTR"], line 25, FIG. 9, represents the absolute path of the edit list table. [file "E0001E01.SMI"], line 27, represents the file name of the edit list file. Since the edit list file describes information about a reproduction method and procedure of material data to be edited in the first edit list, the record and reproduction apparatus 1 can reproduce the first edit list by designating the absolute path described in line 25 and the file name described in line 27.

In addition, line 26 describes a disc internal ID assigned to the first edit list. Thus, the record and reproduction apparatus 1 can reproduce the first edit list by designating disc internal ID [E0001].

In addition, line 26 describes a UMID assigned to the first edit list. Thus, the record and reproduction apparatus 1 can reproduce the first edit list by designating the UMID.

Likewise, in the second to fourth edit lists, file names (including absolute path names), disc internal IDs, and UMIDs are associatively described. For simplicity, their description will be omitted.

In this manner, the index file contains information about edit lists recorded on the disc 32 as an edit list table.

When the process at step S15 shown in FIG. 6 is preformed, the index file described according to XML is generated as shown in FIG. 7 to FIG. 10 and recorded on the disc 32. When the process at step S15 shown in FIG. 6 is performed, since clips and edit lists have not been recorded on the disc 32, information about clips and edit lists shown in FIG. 7 to FIG. 10 is not present.

In the index file, the file name (including the absolute path name) of the edit list file of each edit list recorded on the disc 32 is associated with a disc internal ID and a UMID. Thus, the record and reproduction apparatus 1 can designate an edit list file of an edit list recorded on the disc 32 with a disc internal ID whose data amount is small. Thus, the record and reproduction apparatus 1 can read and reproduce material data of an edit list with a lighter load than the case of which a UMID is used.

In addition, since the file name (including the absolute path name) of the edit list file of the edit list and a UMID can be associated in the index file, even if the edit list exists outside the disc 32, when a table that associates a new file name (including an absolute path name) with a UMID is provide, the record and reproduction apparatus 1 can read and reproduce material data of the edit list.

Thus, when the record and reproduction apparatus 1 generates the index file that totally manages file names (including absolute path names), UMIDs, and disc internal IDs of clips and edit lists, while the versatility of the reference method for clips and edit lists is maintained, the total data amount can be decreased and the load of the process that designates material data in the reproduction process and the record process can be lightened.

FIG. 7 to FIG. 10 show that the values of UMIDs assigned to individual files are the same. However, actually, these values of the UMIDs assigned to these files are different.

FIG. 11 shows a specific example of a description of a disc information file that references a clip or an edit list with the foregoing disc internal ID. In FIG. 11, numerals that start with individual lines are added for convenience of explanation, not part of an XML description.

As described above, the disc information file is a file that manages the reproduction history of material data such as clips, edit list, and so forth recorded on the disc 32. Such a reproduction history is described from a start tag, line 2, FIG. 11 to an end tag, line 11.

For example, line 4, FIG. 11, describes that a clip designation reproduction that is a reproduction for each clip was performed. In addition, line 4 describes the end position (the frame number of video data) of the reproduction. In other words, in this case, a clip with disc internal ID [C0003] stopped at position [00:30:12:23] (frames). [00:30:12:23] represents a time code (FTC: File Time Code) in the unit of a clip. The top frame (first frame) of a clip is [00:00:00:00]. In other words, in the case shown in FIG. 11, clip [C0003] stopped at 30 minutes, 12 seconds, and 23 frames after the top frame.

Line 5, FIG. 11, describes that an edit list designation reproduction that is a reproduction in the unit of an edit list was performed. In addition, line 5 describes the end position (frame number) of the reproduction. In other words, in this case, this line represents that a clip with disc internal ID [E0001] was stopped at position [00:00:00:15] (frames). Since an edit list is an edit result of clips, the edit list may deal with a plurality of clips. In this case, when the edit list designation reproduction is performed, a plurality of clips (a part thereof) are reproduced. However, FTC recoded as a reproduction history is a time code for an edit result of one clip. Thus, even if a plurality of clips are reproduced, frames are counted in the condition that the top frame (the top frame of a clip reproduced first) is [00:00:00:00]. As a result, even if a clip that is reproduced is changed to another clip, the value of FTC of the reproduction history is not returned to [00:00:00:00].

Line 6, FIG. 11, describes that a tape-like reproduction that successively reproduces all clips recorded on the disc 32 as if they were recorded on a tape device was performed. In addition, line 6 describes the end position (frame number of video data) of the reproduction. In other words, in this case, this line represents that that a clip with disc internal ID [C0003] was stopped at position [00:02:23:12] (frames). In this case, FTC recorded as a reproduction history is a time code for each clip. Thus, even if a clip that is reproduced is changed to another clip, the value of FTC of the reproduction history is not returned to [00:00:00:00].

Likewise, line 7, FIG. 11 describes history information of the edit list designation reproduction with a disc internal ID. Line 8 and line 9 each describe history information of the clip designation reproduction with a disc internal ID.

In such a manner, the disc information file contains six records of a reproduction history of material data of clips, edit lists, and so forth recorded on the disc 32. However, the number of records of the reproduction history contained in the disc information file is not restricted.

Records of the reproduction history described from line 4 to line 9 are arranged in the descending order (from the newest record to the oldest record). In other words, the record of the history in line 9 is the oldest, whereas the record of the history in line 4 is the newest. When a new record of the history is registered, the oldest record is deleted. In the reproduction history, a plurality of records of the same clip or same edit list reproduced in the same reproduction method are not present. In other words the foregoing six records of the reproduction history are different either in reproduction methods or in clips or edit lists (disc internal IDs) that were reproduced. When a record that is the same as the currently registered record is newly registered, the older record is deleted.

When the process at step S16 shown in FIG. 6 is performed, the disc information file according to XML as shown in FIG. 11 is generated and recorded on the disc 32.

Thus, since a reproduction history that designates a clip or an edit list is generated with a disc internal ID and the reproduction history is used, when the record and reproduction apparatus 1 shown in FIG. 1 performs a reproduction according to the reproduction history, the total data amount can be decreased and the load of the process that designates material data in the reproduction process and the record process can be lightened.

When the process at step S16 shown in FIG. 6 is preformed, clips and edit lists have not been recorded on the disc 32. Thus, there is no reproduction history of the clips and edit lists. As a result, the reproduction history of the disc information file that is generated is blank. In the case that the disc information file has been generated in such a manner and the reproduction history that designates clips and edit lists with disc internal IDs has been recorded on the disc 32, when the reproduction process of the record and reproduction apparatus 1 is stopped, the disc 32 is unloaded form the drive 26, and then the disc 32 is loaded into the drive 26, the total data amount can be decreased and the load of the process that designates material data in the reproduction process and the record process can be lightened.

The disc information file (reproduction history) of the disc 32 contains only the reproduction history of clips and edit lists recorded on the disc 32. Thus, the disc information file does not designate a file with a UMID.

Next, a file system that manages each type of data recorded on the optical disc 32 and the directory structure and files of the file system will be described.

Data recorded on the disc 32 are managed according to a file system such as UDF. The file system is not limited to UDF. Instead, as long as the file system with which the record and reproduction apparatus 1 can deal, any file system such as IS09660 (International Organization for Standardization 9660) may be used. When a magnetic disc such as a hard disk is used instead of the disc 32, as a file system, FAT (File Allocation Tables), NTFS (New Technology File System), HFS (Hierarchical File System), or UFS (Unix® System), or the like may be used. Instead, a dedicated file system may be used.

Figure 12:
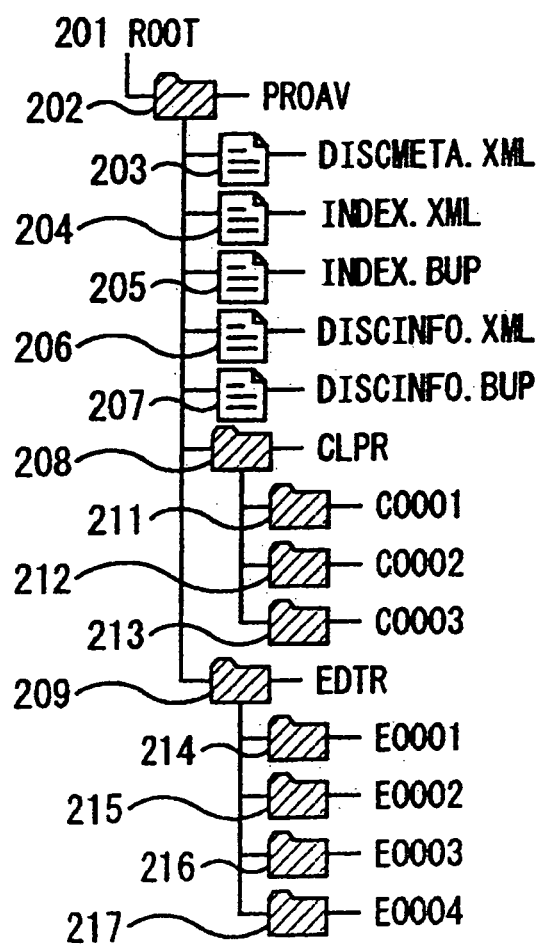
FIG. 12 is a schematic diagram showing an example of the directory structure of a disc shown in FIG. 1.
Figure 14:
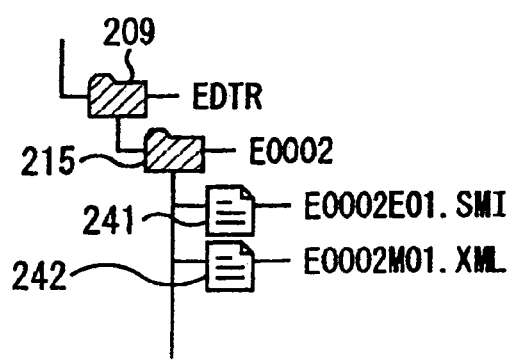
FIG. 14 is a schematic diagram showing an example of the more detailed structure of the directory structure shown in FIG. 4.

In the file system, data recorded on the disc 32 are managed with a directory structure and files shown in FIG. 12 to FIG. 14.

In FIG. 12, under a root directory (ROOT) 201, a PROAV directory 202 is placed. Under the PROAV directory 202, directories for information about material data of video data, audio data, and so forth, edit lists that represent edit results of material data, and so forth are placed.

Under the PROAV directory 202, a disc meta file (DISC-META.XML) 203 that is a file that contains titles and comments of all material data recorded on the disc 32 and information such as a path to video data corresponding to a representative picture as a representative frame of all video data recorded on the disc 32, an index file (INDEX.XML) 204 that contains management information with which all clips and edit lists recorded on the disc 32 are managed and information with which file names (including absolute path names), UMIDs, and disc internal IDs of clips or edit lists are totally managed, and an index file (INDEX.BUP) 205 are placed. The index file 205 is a copy of the index file 204. With the two files, the reliability is improved.

Under the PROAV directory 202, a disc information file (DISCINFO.XML) 206 that is a file that contains meta data of all data recorded on the disc 32, for example information such as a reproduction history that references a clip or an edit list with a disc internal ID and a disc information file (DISCINFO.BUP) 207 are placed. The disc information file 207 is a copy of the disc information file 206. With the two files, the reliability is improved.

Besides these files, under the PROAV directory 202, a clip root directory (CLPR) 208 whose lower directory contains data of clips and an edit list root directory (EDTR) 209 whose lower directory contains data of edit lists are placed.

Under the clip root directory 208, data of clips recorded on the disc 32 are managed with directories corresponding to clips. For example, in the case shown in FIG. 12, data of three clips are managed with three directories that are a clip directory (C0001) 211, a clip directory (C0002) 212, and a clip directory (C0003) 213. In other words, each type of data of the first clip recorded on the disc 32 is managed as a file in a lower directory of the clip directory 211. Each type of data of the second clip recorded in the disc 32 is managed as a file in a lower directory of the clip directory 212. Each type of data of the third clip recorded on the disc 32 are managed as a file in a lower directory of the clip directory 213.

Under the edit list root directory 209, edit lists recorded on the disc 32 are managed with directories corresponding to edit processes. In the case shown in FIG. 12, four edit lists are managed with four directories that are an edit list directory (E0001) 214, an edit list directory (E0002) 215, an edit list directory (E0003) 216, and an edit list directory (E0004) 217. In other words, an edit list that represents the first edit result of a clip recorded on the disc 32 is managed as a file in a lower directory of the edit list directory 214. An edit list that represents the second edit result is managed as a file in a lower directory of the edit list directory 215. An edit list that represents the third edit result is managed as a file in a lower directory of the edit list directory 216. An edit list that represents the fourth edit result is managed as a file in a lower directory of the edit list directory 217.

A lower directory of the clip directory 211 under the clip root directory 208 contains and manages each type of data of a clip recorded first on the disc 32 as files shown in FIG. 13.

In the case shown in FIG. 13, the clip directory 211 contains a clip information file (C0001C01.SMI) 221 that is a file with which the clip is managed, a video data file (C0001V01.MXF) 222 that is a file contains video data of the clip, eight audio data files (C0001A01.MXF to C0001A08.MXF) 223 to 230 that are eight files that contain audio data of individual channels of the clip, a low resolution data file (C0001S01.MXF) 231 that is a file that contains low resolution data corresponding to video data of the clip, a clip meta data file (C0001M01.XML) 232 that is a file that contains clip meta data as meta data that do not need to be in real time corresponding to material data of the clip, a frame meta data file (C0001R01.BIM) 233 that is a file that contains frame meta data that are meta data that need to be in real time corresponding to material data of the clip, a picture pointer file (C0001I01.PPF) 234 that is a file that describes the frame structure of the video data file 222 (for example, information about the compression format of each picture in MPEG or the like and information such as an offset address from the beginning of the file), and so forth.

In the case shown in FIG. 13, video data, low resolution data, and frame meta data that are data that need to be reproduced in real time are managed as different files so that their read times do not increase.

Likewise, audio data need to be reproduced in real time. To deal with audio data of multi channels such as 7.1 channels, eight channels are provided. They are managed as different files. In other words, audio data are managed as eight files. Instead, files for audio data may be seven files or less or nine files or larger.

Likewise, when necessary, video data, low resolution data, and frame meta data may be managed as two or more files each.

In FIG. 13, clip meta data that do not need to be in real time are managed as a file different from frame meta data that need to be in real time. This is because meta data are prevented from being unnecessarily reproduced while video data and so forth are being normally reproduced. Thus, the process time for the reproduction process can be shortened and the load of the process can be lightened.

To allow the clip meta data file 232 to have versatility, the clip meta data file 232 is described in the XML format. However, to shorten the process time for the reproduction process and lighten the load for the process, the frame meta data file 233 is a BIM (BInary format for MPEG-7 data) format file of which an XML format file has been compiled.

The example of the structure of the files in the clip directory 211 shown in FIG. 13 can be applied to all clip directories of clips recorded on the disc 32. In other words, the example of the structure of the files shown in FIG. 13 can be applied to the other directories 212 and 213 shown in FIG. 12. Thus, their description will be omitted.

Each file contained in a clip directory for one clip was described. However, the structure of files is not limited to the foregoing example. Instead, any structure may be used.

Next, an example of the structure of files contained in a lower directory of the edit list root directory 209 shown in FIG. 12 will be described. A lower directory of the edit list directory 215 under the edit list root: directory 209 contains and manages data of an edit list that is information about the second edit result of each type of data of a clip recorded on the disc 32 as files shown in FIG. 14.

In the case shown in FIG. 14, the edit list directory 215 contains an edit list file (E0002E01.SMI) 241 that is a file with which the edit result (edit list) is managed and an edit list clip meta data file (E0002M01.XML) 242 that is a file that contains clip meta data corresponding to the edited material data (a portion extracted as edited data from material data of all clips used in the edit) or clip meta data newly generated according to the clip meta data.

As will be described later, the edit list clip meta data file 242 is a file that contains clip meta data newly generated according to the edited result, namely clip meta data of an edited clip (a clip meta data file contained in a lower directory of the clip root directory 208). For example, when a clip is edited, a portion corresponding to the edited essence data is extracted from the clip meta data contained in the clip meta data file 232 shown in FIG. 13. With the extracted portion, new clip meta data is re-generated as one clip of the edited material data and managed as an edit list clip meta data file. In other words, new clip meta data that are one clip of the edited essence data are added to the edited material data and the clip meta data are managed as one edit list clip meta data file. Thus, the edit list clip meta data file is generated whenever a clip is edited.

To allow the edit list clip meta data file 242 to have versatility, it is described in the XML format.

The forgoing example of the structure of the files in the edit list directory 215 shown in FIG. 14 can be applied to all edit lists (edit results). In other words, the example of the structure of the files shown in FIG. 14 can be applied to the other edit list directory 214, 216, or 217 shown in FIG. 12. Thus, the description of these directories will be omitted.

Each file contained in the edit list directory corresponding to one edit operation was described. However, the structure of files is not limited to the foregoing example. Instead, any structure may be used.

Next, a process performed at timing of which the index file that totally manages file names (including absolute paths), UMIDs, and disc internal IDs of clips or edit lists is updated will be specifically described.

As described above, when a clip and an edit list recorded on the disc 32 are updated, the index file is updated. First of all, the user or the like loads the disc 32 into the drive 26 of the record and reproduction apparatus 1 shown in FIG. 1. When the drive 26 detects the disc 32, the record and reproduction apparatus 1 performs a process shown in a flow chart of FIG. 15, stores the index file recorded on the disc 32 to the index file hold section 51, and obtains the structure of clips, edit lists, and so forth recorded on the disc 32.

Figure 15:
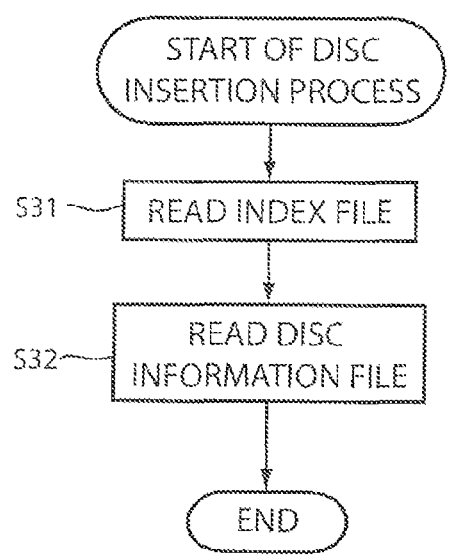
FIG. 15 is a flow chart describing a disc insertion process.

With reference to the flow chart shown in FIG. 15, a disc insertion process executed when the user inserts (loads) the disc 32 into the drive 26 will be described.

When the disc 32 is inserted into the drive 26, the flow advances to step S31. At step S31, the index file read section 61 of the record and reproduction apparatus 1 reads the index file from the disc 32 through the drive 26, supplies the index file to the index file hold section 51, and causes the index file hold section 51 to hold the index file. Thereafter, at step S32, the disc information file read section 62 reads the disc information file from the disc 32 through the drive 26 and causes the disc information file hold section 52 to hold the disc information file. After the disc information file has been read, each section of the record and reproduction apparatus 1 completes the disc insertion process.

Instead, the disc information file may not be read in the disc insertion process. In this case, when the record and reproduction apparatus 1 references the disc information file or updates it, the disc information file read section 61 may read the disc information file in the same manner as the process at step S32.

As described above, the index file is a file that totally manages file names (including absolute path names), UMIDs, and disc internal IDs of clips or edit lists recorded on the disc 32 and manages information about clips and edit lists recorded on the disc 32. Thus, the index file is updated when a clip is added, updated, or deleted or when an edit list is added, updated, or deleted. When a clip is added and an edit list is added, information about a disc internal ID of the index file is generated.

Next, with reference to a flow chart shown in FIG. 16, a clip addition process that newly generates information about a disc internal ID of a clip and that is executed when a clip is added will be described. When necessary, with reference to FIGS. 17 and 18, the process will be described.

When the user or the like issues a command that causes a new clip to be added to the disc 32, the flow advances to step S51. At step S51, the record control section 16 of the record and reproduction apparatus 1 generates a new clip directory under the clip root directory of the disc 32. At this point, the clip directory name is assigned so that it does not become redundant to existing clip directory names.

Thereafter, the flow advances to step S52. At step S52, the record control section 16 generates a clip information file under the clip directory generated in the process at step S51.

FIG. 17 and FIG. 18 are schematic diagrams showing a specific example of a description of a clip information file according to XML. In FIGS. 17 and 18, numerals starting with individual lines are added for convenience of explanation, not part of an XML description.

As was described above, the clip information file is a file that manages information about other files contained in the same clip directory as the clip information file. The clip information file also describes reproduction methods for these files.

As shown in FIG. 17 and FIG. 18, the XML description of the clip information file is mainly composed of a header portion surrounded by header tags (<head> </head>) and a body portion surrounded by body tags (<body> </body>). In the case shown in FIG. 17 and FIG. 18, the header portion is described from line 3, FIG. 17 to line 10, FIG. 17. The body portion is described from line 11, FIG. 17 to line 23, FIG. 18.

The header portion describes information about a clip meta data file contained in the same clip directory. The body portion describes information about the other files (not the clip meta data file) contained in the same clip directory along with the reproduction methods of these files.

For example, line 6 to line 8, FIG. 17, describe information about the clip meta data file.

Line 16 to line 18, FIG. 17, describe information about a video data file. Line 19 to line 21, FIG. 17, describe information about an audio data file of channel 1. Line 22 to line 24, FIG. 17, describe information about an audio data file of channel 2. Line 25 to line 27, FIG. 17, describe information about an audio data file of channel 3. Line 28, FIG. 17 to line 18, FIG. 18, describe information about an audio data file of channel 4. Line 2 to line 4, FIG. 18, describe information about an audio data file of channel 5. Line 5 to line 7, FIG. 18, describe information about an audio data file of channel 6. Line 8 to line 10, FIG. 18, describe information about an audio data file of channel 7. Line 11 to line 13, FIG. 18, describe information about an audio data file of channel 8.

Line 16 to line 18, FIG. 18, describe information about a low resolution data file as a sub stream. Line 21, FIG. 18, describes information about a frame meta data file.

Files of video data, audio data, and low resolution data are identified with UMIDs. Specifically, line 17, FIG. 17, describes [umid:060A2B340101010501010D12130000000 123456789ABCDEF0123456789ABCDEF] that designates video data with a UMID. Line 20 describes [umid: 060A2B340101010501010D1213000000 0123456789 ABCDEF0123456789ABCDEF0] that designates audio data of channel 1 with a UMID. Line 23 describes [umid:

060A2B340101010501010D12130000000123456789ABC DEF0123456789ABCDEF01] that designates audio data of channel 2 with a UMID. Line 26 describes [umid: 060A2B340101010501010D12130000000123456789ABC DEF0123456789ABCDEF012] that designates audio data of channel 3 with a UMID.

Line 29, FIG. 17, describes [umid: 060A2B340101010501010D12130000000123456789ABC DEF0123456789ABCDEF0123] that designates audio data of channel 4 with a UMID. Line 3, FIG. 18, describes [umid: 060A2B340101010501010D12130000000123456789ABC DEF0123456789ABCDEF01234] that designates audio data of channel 5 with a UMID. Line 6, FIG. 18 describes [umid: 060A2B340101010501010D12130000000123456789ABC DEF0123456789ABCDEF012345] that designates audio data of channel 6 with a UMID.

Line 9, FIG. 18, describes [umid: 060A2B340101010501010D12130000000123456789ABC DEF0123456789ABCDEF0123456] that designates audio data of channel 7 with a UMID. Line 12 describes [umid: 060A2B340101010 501010D12130000000123456789ABC DEF0123456789ABCDEF012 34567] that designates audio data of channel 8 with a UMID.

Line 17 describes [umid:060A2B340101 010501010D12130000000123456789ABCDEF0123456789 ABCDEF012345678] that designates low resolution data with a UMID.

As described above, the XML description of the clip information file describes information about other files contained in the same clip directory. In addition, the clip information file designates and accesses files of video data, audio data, and so forth with basic UMIDs of 32 bytes (64 characters) each.

Returning to FIG. 16, at step S53, the record control section 16 generates files for individual types of material data that compose the clip under the clip directory generated in the process at step S51. When the clip to be added is composed of video data, audio data, and clip meta data, the record control section 16 records the video data, audio data, and clip meta data as different files.

After the record control section 16 has completed the process at step S53, the flow advances to step S54. At step S54, the index file management section 72 of the record control section 16 adds information of the added clip to the clip table of the index file held in the index file hold section 51 (hereinafter, the information of the added clip is referred to as a clip element).

At step S55, the search section 92 of the record control section 16 references the clip table, searches it for the maximum value of the serial number portion of the disc internal ID, and obtains the maximum value. The search section 92 supplies the maximum value of the serial number portion of the disc internal ID to the disc internal ID generation section 91. Thereafter, the flow advances to step S56.

At step S56, the disc internal ID generation section 91 of the record control section 16 generates a new disc internal ID according to the supplied maximum value of the serial number portion of the disc internal ID so that it does not become redundant to existing disc internal IDs for example by adding value "1" to the maximum value of the serial number portion, and supplies the newly generated disc internal ID to the index file management section 72. Thereafter, the flow advances to step S57.

At step S57, the index file management section 72 adds the newly generated disc internal ID to the clip element newly added to the clip table of the index file held in the index file hold section 51 and associates the disc internal ID with the UMID and the file name of the clip information file contained in the clip element.

At step S58, the index file record control section 73 records the updated index file held in the index file hold section 51 on the disc 32 so that the updated index file is overwritten on the existing index file on the disc 32. When the index file record control section 73 has updated the index file on the disc 32, the index file record control section 73 completes the clip addition process.

When a clip is added in the foregoing manner, the index file recorded on the disc 32 is updated so that a new disc internal ID is added.

Figure 19:
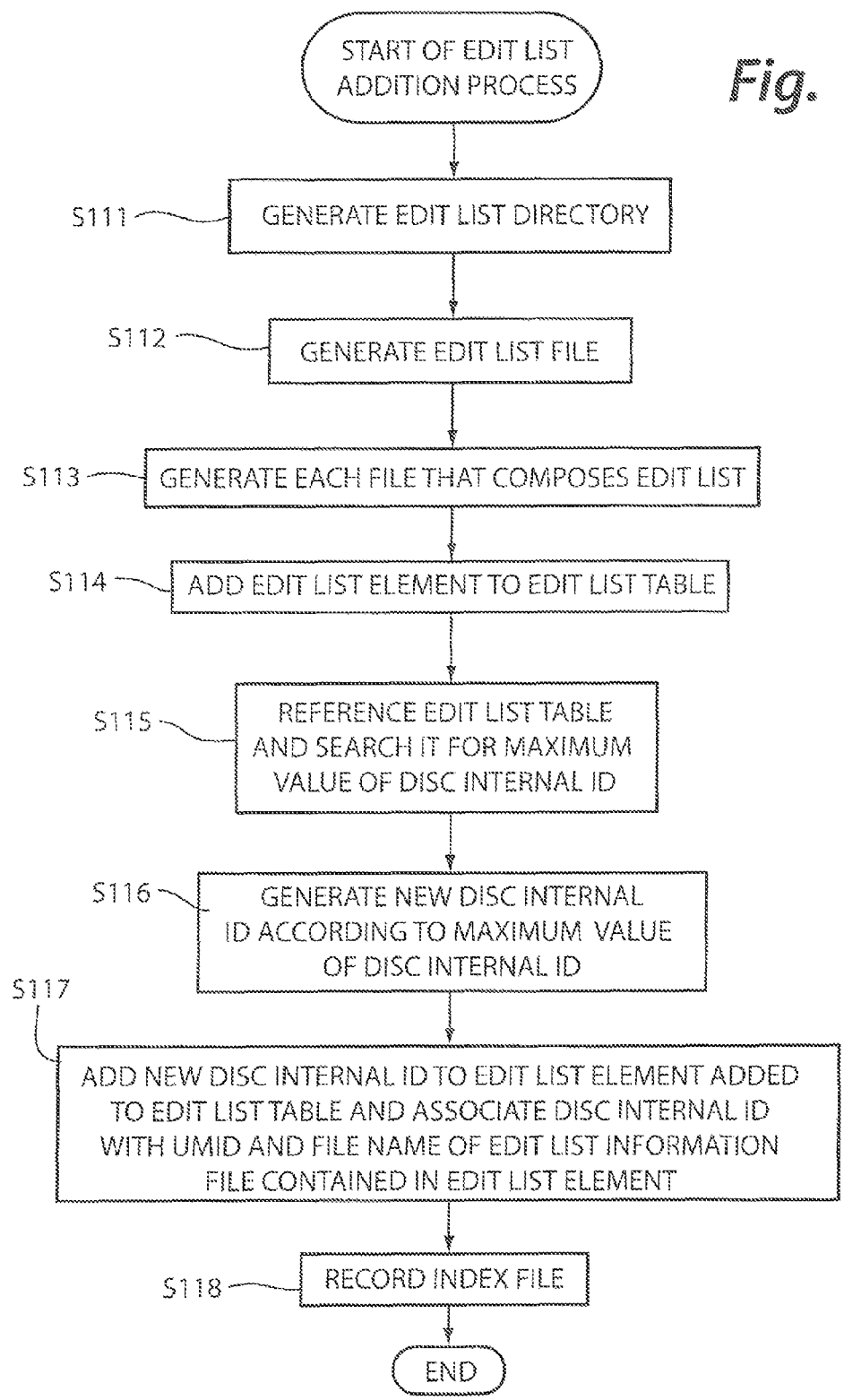
FIG. 19 is a flow chart describing an edit list addition process.

Next, with reference to a flow chart shown in FIG. 19, an edit list addition process that newly generates information about a disc internal ID of an edit list and that is executed when an edit list is added will be described. When necessary, with reference to FIG. 20, the process will be described.

After a clip recorded on the disc 32 has been edited in the manner that original material data are not updated, when a process that generates an edit list as edit information as the edit result has been performed (hereinafter, this process is referred to as the non-destructive edit), when the user or the like issues a command that causes a new edit list to be added to the disc 32, the flow advances to step S111. At step S111, the record control section 16 of the record and reproduction apparatus 1 generates a new edit list directory under the root directory of the disc 32. At this point, the edit list directory name is designated so that it does not become redundant to the existing edit list directory names.

Thereafter, the flow advances to step S112. At step S112, the record control section 16 generates an edit list file under the edit list directory generated in the process at step S111.

FIG. 20 is a schematic diagram showing a specific example of a description of an edit list file according to XML. In FIG. 20, numerals starting with individual lines are added for convenience of explanation, not part of an XML description.

As described above, an edit list file is a file that contains edit information of a non-destructive edit result of clips along with a reproduction method of the edit result.

As shown in FIG. 20, the XML description of the edit list file is mainly composed of a header portion surrounded by header tags (<head></head>) and a body portion surrounded by body tags (<body></body>). In the case shown in FIG. 20, the header portion is described from line 3 to line 10, FIG. 22. The body portion is described from line 11 to line 24.

The header portion describes information about an edit list meta data file contained in the same edit list directory. The body portion describes information of the edit result along with a reproduction method. In the case shown in FIG. 20, the body portion describes that an edit is performed so that two clips of first clip (clip 1) and second clip (clip 2) are connected.

In other words, line 12 and line 23, FIG. 20 describe parallel tags (<par> <par>) that represent that clips surrounded by the tags are successively reproduced. Line 14 to line 17 describe information about the first clip. Line 19 to line 22 describe information about the second clip.

As shown in FIG. 20, information of the first clip (clip information file) and the second clip (clip information file) are designated with UMIDs that are general purpose IDs. In other words, line 15, FIG. 20, describes [umid: 060A2B340101010501010D1213000000FEDCBA9876543 210FEDCBA9876543210] that designates the first clip with a UMID.

Line 20, FIG. 20, describes [umid:060A2B34 0101010501010D1213000000FEDCBA9876543210FEDC BA987654321 0F] that designates the second clip with a UMID.

As described above, the XML description of the edit list file expected to be used outside the disc 32 describes non-destructive edit information. A clip that is edited is designated with a UMID.

Returning to FIG. 19, at step S113, the record control section 16 generates files that compose an edit list (other than an edit list file) such as an edit list meta data file under the edit list directory generated in the process at step S111.

After the record control section 16 has completed the process at step S113, the flow advances to step S114. At step S114, the index file management section 72 of the record control section 16 adds information about the added edit list to the edit list table of the index file held in the index file hold section 51 (hereinafter, this information is referred to as an edit list element).

Thereafter, the flow advances to step S115. At step S115, the search section 92 references the edit list table of the index file held in the index file hold section 51, searches it for the maximum value of the disc internal ID assigned to the edit list, and obtains the maximum value. The search section 92 supplies the maximum value to the disc internal ID generation section 91. The disc internal ID generation section 91 generates a new disc internal ID according to the supplied maximum value of the serial number portion of the disc internal ID so that it does not become redundant to existing disc internal IDs for example by adding value "1" to the maximum value of the serial number portion and supplies the newly generated disc internal ID to the index file management section 72.

At step S117, the index file management section 72 adds the supplied new disc internal ID to the edit list element added to the edit list table of the index file held in the index file hold section 51 and associates the disc internal ID with the UMID and the file name of the edit list file contained in the edit list element.

When the index file management section 72 has updated the edit list table of the index file held in the index file hold section 51 according to the addition of the edit list, the flow advances to step S118. At step S118, the index file record control section 73 records the updated index file held in the index file hold section 51 on the disc 32 so that the updated index file is overwritten on the existing index file of the disc 32 (the existing index file on the disc 32 is updated). After the index file record control section 73 has updated the index file on the disc 32, the index file record control section 73 completes the edit list update process.

When an edit list is updated with a disc internal ID in the foregoing manner, the index file recorded on the disc 32 is updated so that the disc internal ID is newly added.

Next, a process performed at timing of which the disc information file that references a clip and an edit list with a disc internal ID is updated will be specifically described.

As described above, the disc information file is a file that manages a reproduction history of clips and edit lists recoded on the disc 32 with disc internal IDs. Thus, the disc information file is updated when a reproduction process such as the tape-like reproduction, the edit list designation reproduction, the clip designation reproduction, or the like is completed.

Firstly, with reference to a flow chart shown in FIGS. 21 and 22, the tape-like reproduction process executed when all clips recorded on the disc 32 are successively reproduced as if they were recorded on a tape device will be described.

When the user or the like issues a command for the take-lie reproduction, the flow advances to step S201. At step S201, the disc information management section 63 reference the disc information file held in the disc information file hold section 52 of the information hold section 14 and determines whether the reproduction history of the disc information file contains a record history of the tape-like reproduction.

When the disc has been inserted into the drive, if the disc information file has not been read therefrom, the flow advances to step S201. At step S201, the disc information file read section 62 performs a process that reads a history record of the tape-like reproduction from the disc information file on the disc 32. The disc information management section 63 determines whether the reproduction history contains a history record of the tape-like reproduction depending on whether the disc information file read section 62 has read a history record of the tape-like reproduction from the disc information file.

Figure 25:
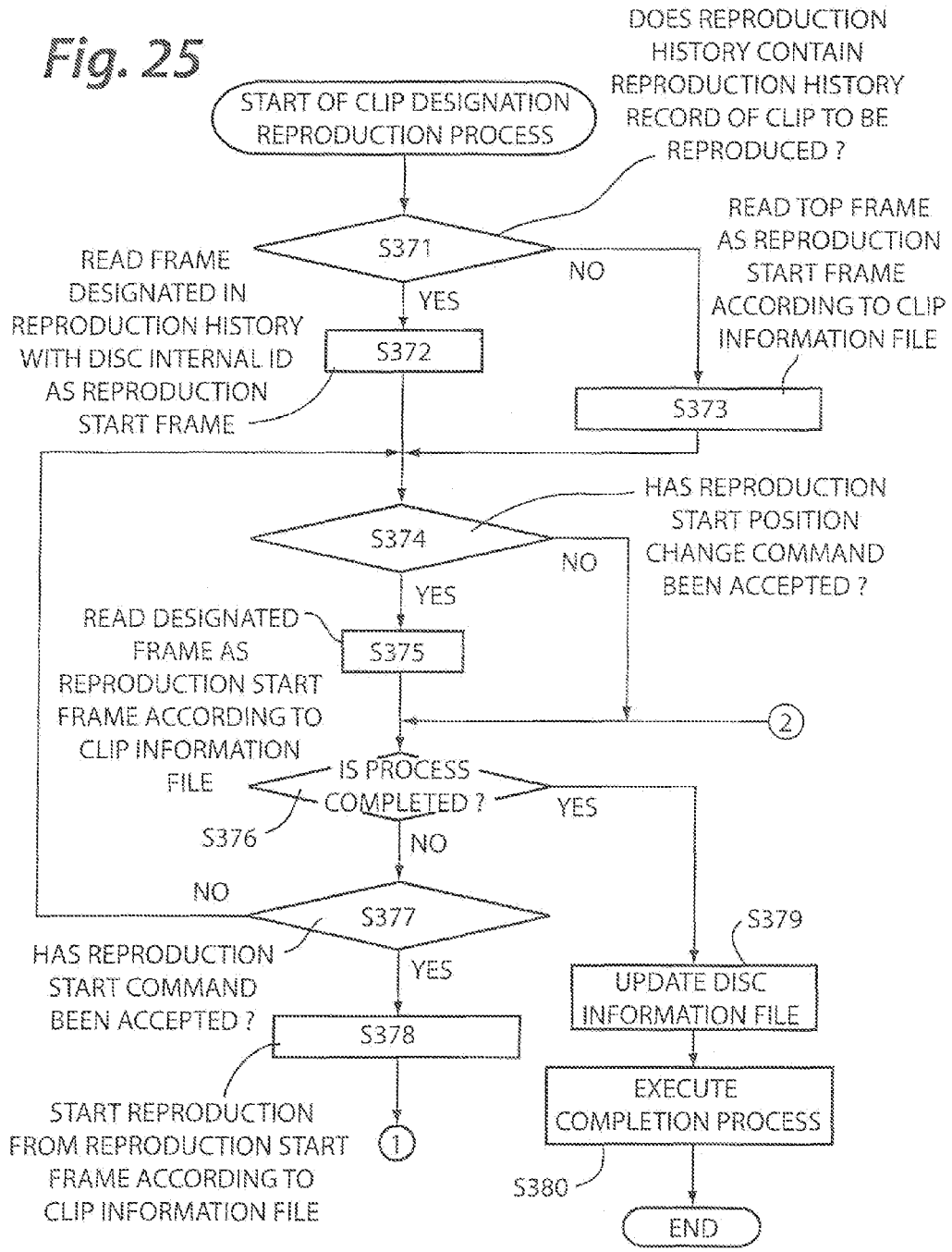
FIG. 25 is a flow chart describing a clip designation reproduction process.

When the determined result at step S201 shown in FIG. 25 represents that the reproduction history contains a history record of the tape-like reproduction, the flow advances to step S202. At step S202, the reproduction control section 15 reads a frame of a clip designated in the reproduction history with a disc internal ID as a reproduction start frame according to the clip table from the disc 32. At this point, the reproduction control section 15 references an index file held in the index file hold section 51, accesses a clip corresponding to the disc internal ID of the reproduction history, and reads the designated frame. After the reproduction control section 15 has read the reproduction start frame, the flow advances to step S204.

When the determined result at step S201 represents that the reproduction history does not contain a history record of the tape-like reproduction, the flow advances to step S203. At step S203, the reproduction control section 15 reads the top frame of the first clip as a reproduction start frame from the disc 32 according to the clip table of the index file held in the index file hold section 51. Thereafter, the flow advances to step S204.

The first clip is a clip designated as a clip to be reproduced first in the XML description of the index file shown in FIG. 7 to FIG. 10. The top frame is a frame designated as a frame to be reproduced first in the XML description of the index file. Thus, the first frame is not always a frame that is reproduced first in material data of a clip. Thus, if the XML description of the index file describes that the reproduction for a clip starts from a middle frame, this frame is the first frame.

At step S204, the reproduction control section 15 determines whether the reproduction start position change command has been accepted. When the user has operated the input section 21 and inputted the reproduction start position change command, the reproduction control section 15 determines that it has accepted the reproduction start position change command. Thereafter, the flow advances to step S205. At step S205, the reproduction control section 15 reads the frame of the clip designated with the disc internal ID as the reproduction start frame from the disc 32 according to the clip table of the index file held in the index file hold section 51. Thereafter, the flow advances to step S206. When the determined result at step S204 represents that the reproduction control section 15 has not accepted the reproduction start position change command, the flow advances to step S206 not through step S205.

At step S206, the reproduction control section 15 determines whether it completes the tape-like reproduction process. When the determined result represents that the reproduction control section 15 does not complete the tape-like reproduction process, the flow advances to step S207. At step S207, the reproduction control section 15 determines whether it has accepted the reproduction start command. When the determined result represents that the reproduction control section 15 has not accepted the reproduction start command, the flow returns to step S204. At step S20, the reproduction control section 15 repeats the process.

In other words, while the reproduction control section 15 is repeating the process from steps s204 to S207, the reproduction control section 15 waits until it has accepted the reproduction start command or completed the tape-like reproduction process. When the determined result at step. S207 represents that the reproduction control section 15 has accepted the reproduction start command, the flow advances to step S208. At step S208, the reproduction control section 15 starts the reproduction from the reproduction start frame according to the clip table of the index file held in the index file hold section 51. When the reproduction control section 15 starts the reproduction, the flow advances to step S231 shown in FIG. 22.

Figure 21:
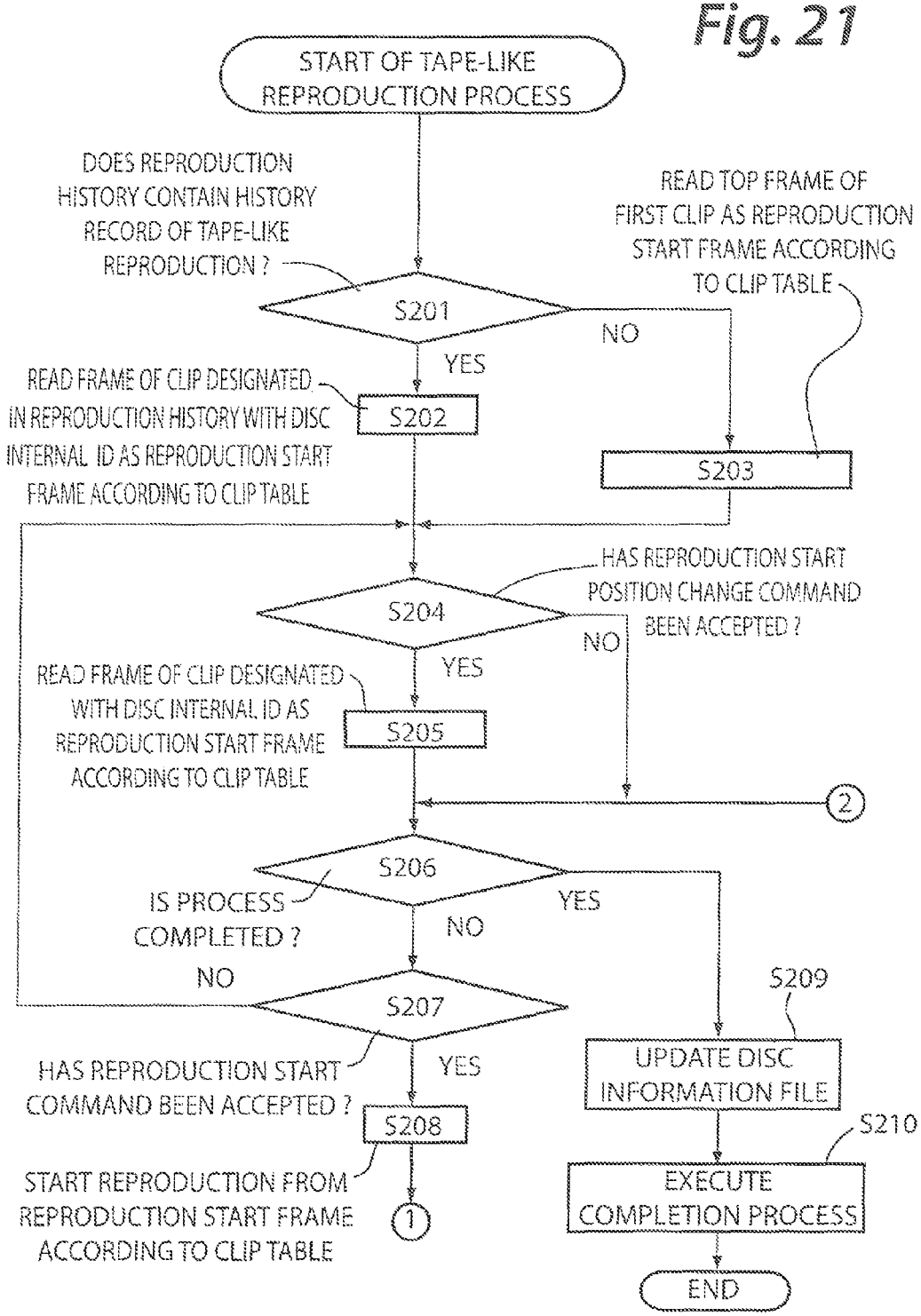
FIG. 21 is a flow chart describing a tape-like reproduction process.

When the determined result at step S206 shown in FIG. 21 represents that the reproduction control section 15 completes the tape-like reproduction process according to a user's command or the like, the flow advances to step S209. At step S209, the disc information file management section 63 of the reproduction control section 15 updates the reproduction history of the disc information file. At this point, when the disc insertion process has been performed, if the disc information file has been read from the disc 32 and held in the disc information file hold section 52, the disc information file management section 63 updates the reproduction history of the disc information file held in the disc information file hold section 52. In contrast, when the disc insertion process has been performed, if the disc information file has not been: read from the disc 32 and the file exists only on the disc 32, the disc information file management section 63 supplies a reproduction history (disc information file) to be updated to the disc information file record control section 82. The disc information file record control section 82 updates the disc information file recorded on the disc 32 with the supplied reproduction history. Details of the update of the disc information file will be described later with reference to a flow chart shown in FIG. 27 and FIG. 28.

When the disc information file record control section 82 has updated the disc information file, the flow advances to step S210. At step S210, the reproduction control section 15 executes a completion process to complete the tape-like reproduction process.

Figure 22:
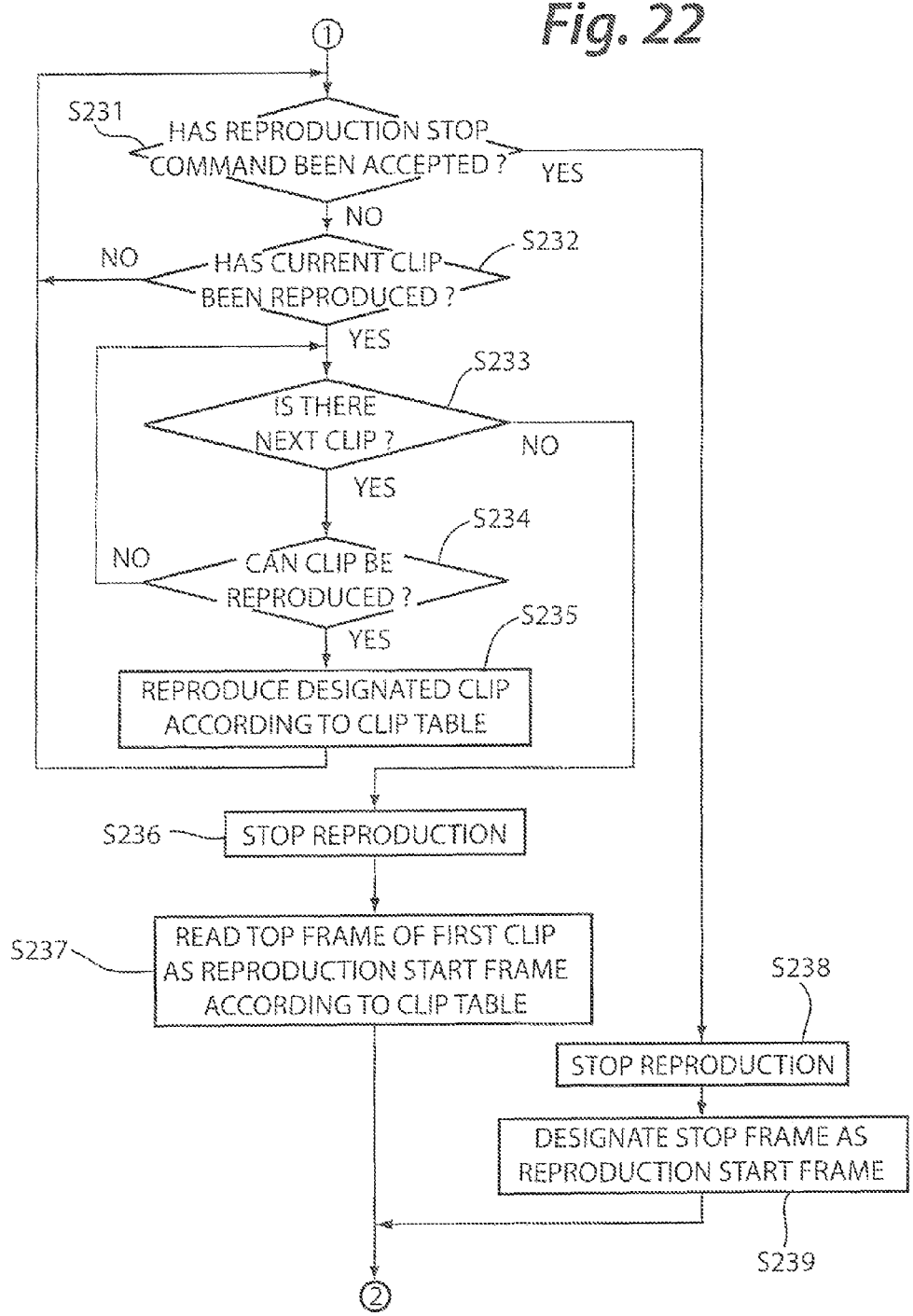
FIG. 22 is a flow chart describing the tape-like reproduction process as a part preceded by FIG. 21.

When the reproduction control section 15 has reproduced the clip at step S208 shown in FIG. 21, the flow advances to step S231 shown in FIG. 22. At step S231, the reproduction control section 15 determines whether it has accepted the reproduction stop command. When the determined result represents that the reproduction control section 15 has not accepted the reproduction stop command and continues the reproduction process, the flow advances to step S232. At step S232, the reproduction control section 15 determines whether it has reproduced the current clip. When the determined result represents that the reproduction control section 15 has not reproduced the current clip, the flow returns to step S231. At step S231, the reproduction control section 15 continues the reproduction process.

When the determined result at step S232 represents: that the reproduction control section 15 has reproduced the current clip, the flow advances to step S233. At step S233, the reproduction control section 15 determines whether there is a clip to be reproduced next according to the XML description of the index file as shown in FIG. 7 to FIG. 10. When the XML description of the index file describes that the clip that has been reproduced is not: the last clip, but followed by another clip, the flow advances to step S234. At step S234, the reproduction control section 15 references attribute information of a clip directory of the clip to be reproduced next and determines whether the clip can be reproduced.

When the determined result represents that the clip cannot be reproduced because the attribute of the clip directory of the clip to be reproduced is for example "read prohibited," the flow returns to step S233. At step S233, the reproduction control section 15 repeats the process for the next clip.

When the determined result at step S234 represents that the clip can be reproduced because the attribute of the clip directory of the clip to be reproduced is for example "read permitted," the flow advances to step S235. At step S235, the reproduction control section 15 references the clip table of the index file held in the index file hold section 51 and reproduces the designated clip according to information of the clip table. When the reproduction control section 15 has started the reproduction for the clip, the flow returns to step S231. At step S231, the reproduction control section 15 repeats the process.

In other words, while the reproduction control section 15 is repeating the process from step S231 to step S235, the reproduction control section 15 reproduces all clips in the order of which they are described in the index file.

When the determined result at step S233 represents that the reproduction control section 15 has reproduced the last clip in the XML description of the index file and there is no clip to be reproduced next, the flow advances to step S236. At step S236, the reproduction control section 15 stops the reproduction. Thereafter, the flow advances to step S237. At step S237, the reproduction control section 15 reads the top frame of the first clip as the reproduction start frame according to the clip table of the index file held in the index file hold section 51. Thereafter, the flow returns to step S206 shown in FIG. 21. At step S206, the reproduction control section 15 repeats the process.

In other words, when the reproduction control section has fully performed the tape-like reproduction (for the last clip), the reproduction control section stops the reproduction process and designates the top frame of the top clip of the XML description of the index file as the reproduction start frame of the next reproduction process.

When the determined result at step S231 represents that while reproducing the clip, the reproduction control section 15 has accepted the reproduction stop command from the user or the like, the flow advances to step S238. At step S238, the reproduction control section 15 stops the reproduction. Thereafter, the advances to step S239. At step S239, the reproduction control section 15 designates the stop frame as the reproduction start frame of the next reproduction process. After the reproduction control section 15 has designated the reproduction start frame, the flow returns to step S206 shown in FIG. 21. At step S206, the reproduction control section 15 repeats the process.

Thus, the record and reproduction apparatus 1 can record the reproduction history on the disc 32, use the reproduction history in the next tape-like reproduction process, and resume the tape-like reproduction from the last reproduction stop position.

Next, with reference to a flow chart shown in FIG. 23 and FIG. 24, an edit list designation reproduction process executed when an edit list is designated and the designated edit list is reproduced will be described.

Figure 23:
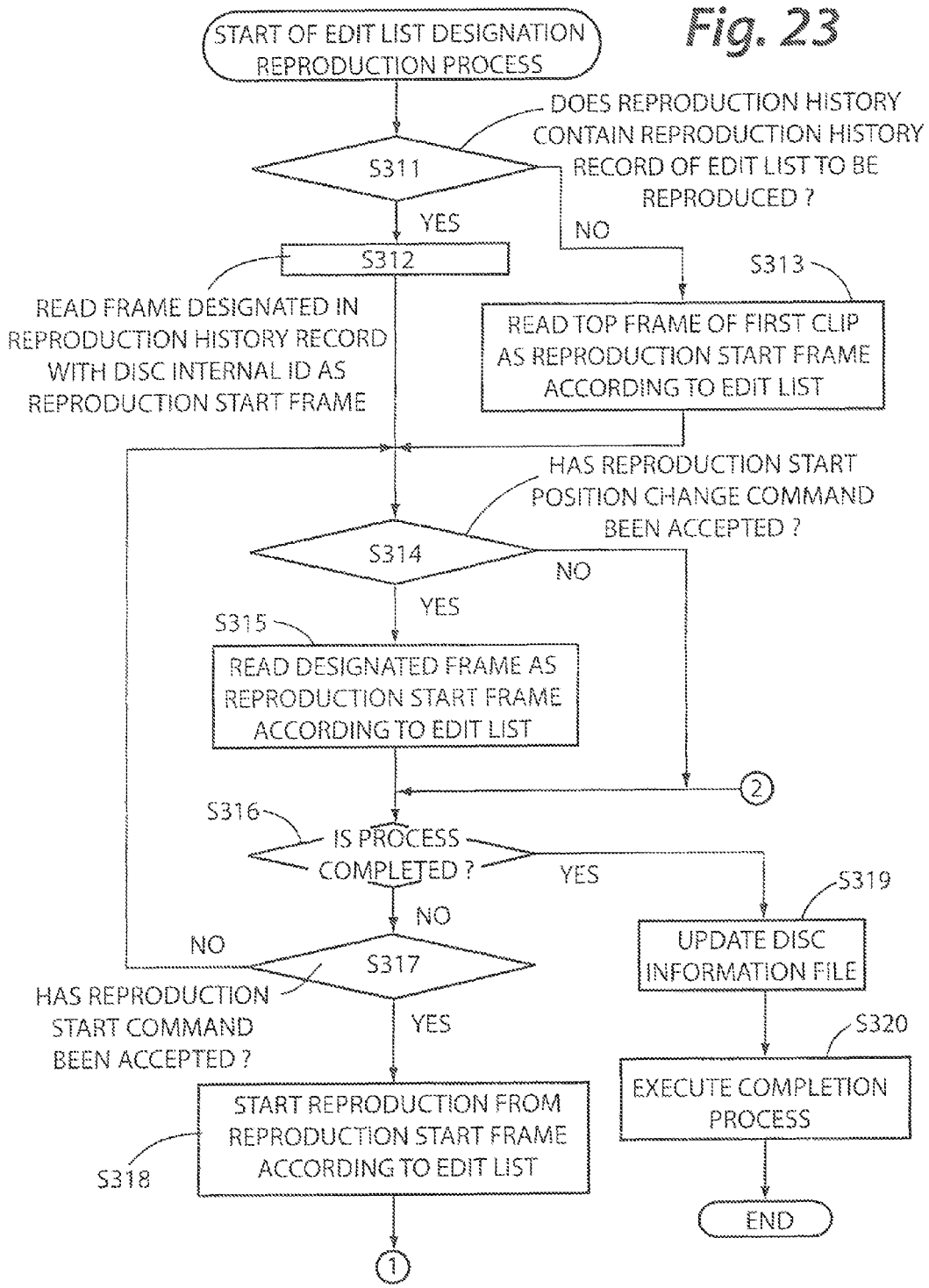
FIG. 23 is a flow chart describing an edit list designation reproduction process.

When the user or the like designates an edit list and issues a command that causes the designated edit list to be reproduced, the flow advances to step S311 shown in FIG. 23. At step S311, the disc information management section 63 of the reproduction control section 15 references the disc information file held in the disc information file hold section 52 of the information hold section 14 and determines whether the reproduction history of the disc information file contains a reproduction history record of the designated edit list.

When the disc has been inserted, if the disc information file has not been read from the disc, the flow advances to step S311. At step S311, the disc information file read section 62 performs a process that reads a reproduction history record of the designated edit list from the disc information file on the disc 32. The disc information management section 63 determines whether the reproduction history contains a reproduction history record of the designated edit list depending on the determined result of whether the disc information file read section 62 has read the reproduction history record of the edit list.

When the determined result at step S311 shown in FIG. 23 represents that reproduction history of the disc information file contains a reproduction history record of the designated edit list, the flow advances to step S312. At step S312, the reproduction control section 15 reads the designated frame in the reproduction history record with a disc internal ID as a reproduction start frame from the disc 32. At this point, the reproduction control section 15 references the index file held in the index file hold section 51 and obtains an edit list corresponding to the disc internal ID of the reproduction history record, namely the file name (including the path name) of the edit list file. In addition, the reproduction control section 15 accesses the target edit list corresponding to the file name of the obtained edit list file and reads the designated frame. After the reproduction control section 15 has read the reproduction start frame, the flow advances to step S314.

When the determined result at step S311 represents that the reproduction history does not contain a reproduction history record of the designated edit list, the flow advances to step S313. At step S313, the reproduction control section 15 reads the top frame of the first clip as the reproduction start frame from the disc 32 according to the XML description of the edit list file. Thereafter, the flow advances to step S314.

The first clip is a clip designated as a clip to be reproduced first in the XML description of the edit list file shown in FIG. 20. The top frame is a frame designated as a frame to be reproduced first in the XML description of the edit list file or the clip information file or the like of the clips corresponding to the edit list shown in FIG. 17 and FIG. 18. Thus, the first frame is not always a frame that is reproduced first in material data of a clip. Thus, if the XML description of the edit list file describes that the reproduction for a clip starts from a middle frame, this frame is the first frame.

At step S314, the reproduction control section 15 determines whether it has accepted the reproduction start position change command. When the user has operated the input section 21 and inputted the reproduction start position change command, the reproduction control section 15 determines that it has accepted the reproduction start position change command. Thereafter, the flow advances to step S315. At step S315, the reproduction control section 15 references a clip information file of a clip corresponding to the designated frame according to the XML description of the edit list file and reads the designated frame as a reproduction start frame from the disc 32. Thereafter, the flow advances to step S316. When the determined result at step S314 represents that the reproduction control section 15 has not accepted the reproduction start position change command, the flow advances to step S316 not through step S315.

At step S316, the reproduction control section 15 determines whether it completes the edit list designation reproduction process. When the determined result represents that the reproduction control section 15 does not complete the edit list designation reproduction process, the flow advances to step S317. At step S317, the reproduction control section 15 determines whether it has accepted the reproduction start command. When the determined result represents that the reproduction control section 15 has not accepted the reproduction start command, the flow returns to step S314. At step S314, the reproduction control section 15 repeats the process.

In other words, while the reproduction control section 15 is repeating the process from steps S314 to S317, the reproduction control section 15 waits until it has accepted the reproduction start command or completed the edit list designation reproduction process. When the determined result at step S317 represents that the reproduction control section 15 has accepted the reproduction start command, the flow advances to step S318. At step S318, the reproduction control section 15 references the clip information file according to the XML description of the edit list file and starts the reproduction from the reproduction start frame according to information of the clip information file. When the reproduction control section 15 has started the reproduction, the flow advances to step S341 shown in FIG. 28.

At step S318, the reproduction control section 15 may reference the clip table of the index file according to the XML description of the edit list file. Each clip element of the clip table of the index file describes basically the same information as the clip information file. Thus, with reference to the corresponding clip element of the clip table, the reproduction control section 15 can read the clip and reproduce it.

When the determined result at step S316 shown in FIG. 23 represents that the reproduction control section 15 completes the edit list designation reproduction process according to a user's command or the like, the flow advances to step S319. At step S319, the disc information file management section 63 of the reproduction control section 15 updates the reproduction history of the disc information file. When the disc insertion process has been performed, if the disc information file has been read from the disc 32, the disc information file is held in the disc information file hold section 52. In this case, the disc information file management section 63 updates the reproduction history of the disc information file held in the disc information file hold section 52. When the disc insertion process has been performed, if the disc information file has not been read from the disc 32, the disc information file is present only on the disc 32. In this case, the disc information file management section 63 supplies a reproduction history (disc information file) to be updated to the disc information file record control section 82. The disc information file record control section 82 updates the disc information file recoded on the disc 32 with the supplied reproduction history. Details of the update of the disc information file will be described later with reference to a flow chart shown in FIG. 27 and FIG. 28.

When the disc information file record control section 82 has updated the disc information file, the flow advances to step S320. At step S320, the reproduction control section 15 executes a completion process to complete the edit list designation reproduction process.

Figure 24:
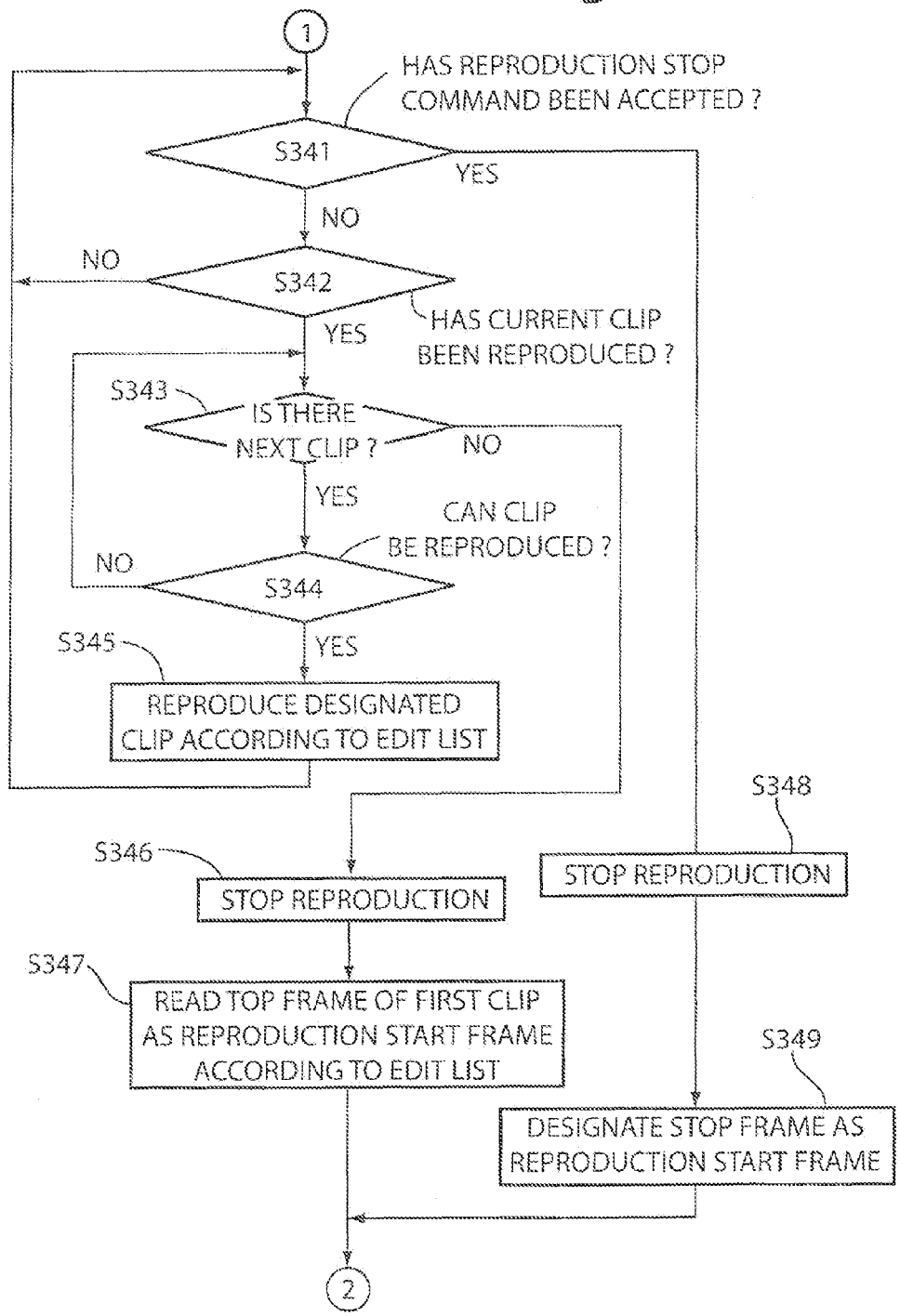
FIG. 24 is a flow chart describing the edit list designation process as a part preceded by FIG. 23.

When the reproduction control section 15 has started the reproduction for the clip at step S318 shown in FIG. 23, the flow advances to step S341 shown in FIG. 24. At step S341, the reproduction control section 15 determines whether it has accepted the reproduction stop command. When the determined result represents that the reproduction control section 15 has not accepted the command and continues the reproduction process, the flow advances to step S342. At step S342, the reproduction control section 15 determines whether it has reproduced the current clip. When the determined result represents that the reproduction control section 15 has not reproduced the current clip, the flow returns to step S341. At step S341, the reproduction control section 15 continues the process.

When the determined result at step S342 represents that the reproduction control section 15 has reproduced the current clip, the flow advances to step S343. At step S343, the reproduction control section 15 determines whether there is a clip to be reproduced next according to the XML description of the edit list file. When the determined result represents that there is a clip to be reproduced next because the clip that the reproduction control section 15 has reproduced is not the last clip in the XML description of the edit list file, the flow advances to step S344. At step S344, the reproduction control section 15 references attribute information of a clip directory of the clip and determines whether the reproduction control section 15 can reproduce the clip.

When the determined result represents that the reproduction control section 15 cannot reproduce the clip because the attribute of the clip directory of the clip to be reproduced is for example "read prohibited," the reproduction control section 15 does not reproduce the clip. Thereafter, the flow returns to step S343. At step S343, the reproduction control section 15 repeats the process for the next clip.

When the determined result at step S344 represents that the reproduction control section 15 can reproduce the clip because the attribute of the clip directory of the clip to be reproduced is for example "read permitted," the flow advances to step S345. At step S345, the reproduction control section 15 references the XML description of the edit list file and reproduces the designated clip according to the description. When the reproduction control section 15 has started the reproduction for the clip, the flow returns to step S341. At step S341, the reproduction control section 15 repeats the process.

In other words, while the reproduction control section 15 is repeating the process from step S341 to step S345, the reproduction control section 15 reproduces clips in the order of which they are described in the edit list file.

At step S345, the reproduction control section 15 may reference the clip table of the index file according to the XML description of the edit list file. Each clip element of the clip table of the index file describes basically the same information as the clip information file. Thus, with reference to the clip elements of the clip table, the reproduction control section 15 can read the clip and reproduce it.

When the reproduction control section 15 has completed the reproduction for the last clip in the XML description of the edit list file and determines that there is no clip to be reproduced next, the flow advances to step S346. At step S346, the reproduction control section 15 stop the reproduction. Thereafter, the flow advances to step S347. At step S347, the reproduction control section 15 reads the top frame of the first clip as a reproduction start frame according to the XML description of the edit list file. Thereafter, the flow returns to step S316 shown in FIG. 23. At step S316, the reproduction control section 15 repeats the process.

In other words, when the reproduction control section 15 has reproduced the last frame in the edit list designation reproduction, the reproduction control section stops the reproduction process and designates the first frame of the first clip in the XML description of the edit list file as the reproduction start frame of the next reproduction process.

When the determined result at step S341 shown in FIG. 24 represents that the reproduction control section 15 has accepted the reproduction stop command from the user or the like while reproducing the clip, the flow advances to step S348. At step S348, the reproduction control section 15 stops the reproduction. At step S349, the reproduction control section 15 designates the stop frame as the reproduction start frame of the next reproduction process. After the reproduction control section 15 has designated the reproduction start frame, the flow returns to step S316 shown in FIG. 23. At step S316, the reproduction control section 15 repeats the process.

Thus, when the record and reproduction apparatus 1 performs the edit list designation reproduction, the record and reproduction apparatus 1 can record a reproduction history on the disc 32. The record and reproduction apparatus 1 can use the reproduction history in the next edit list designation reproduction process and resume the edit list designation reproduction from the last reproduction stop position.

Next, with reference to a flow chart shown in FIG. 25 and FIG. 26, a clip designation reproduction process executed when a clip is designated and the designated clip is reproduced will be described.

When the user or the like designates a clip and issues a command that causes the designated clip to be reproduced, the flow advances to step. S371 shown in FIG. 25. At step S371, the disc information management section 63 of the reproduction control section 15 references the disc information file held in the disc information file hold section 52 of the information hold section 14 and determines whether the reproduction history of the disc information file contains a reproduction history record of the clip designation reproduction of the designated clip.

When the disc has been inserted, if the disc information file has not been read from the disc, the flow advances to step S371. At step S371, the disc information file read section 62 performs a process that reads a reproduction history record of the designated clip from the disc information file on the disc 32. The disc information management section 63 determines whether the reproduction history contains a reproduction history record of the clip designation reproduction of the designated clip depending on the determined result of whether the disc information file read section 62 has read the reproduction history record of the clip designation reproduction of the clip.

When the determined result at step S371 shown in FIG. 25 represents that reproduction history of the disc information file contains a reproduction history record of the clip designation reproduction of the designated clip, the flow advances to step S372. At step S372, the reproduction control section 15 reads the designated frame in the reproduction history record with a disc internal ID as a reproduction start frame from the disc 32. At this point, the reproduction control section 15 references the index file held in the index file hold section 51 and obtains a clip corresponding to the disc internal ID of the reproduction history record, namely the file name (including the path name) of the clip information file. In addition, the reproduction control section 15 accesses the target clip corresponding to the file name of the obtained clip information file and reads the designated frame. After the reproduction control section 15 has read the reproduction start frame, the flow advances to step S374.

When the determined result at step S371 represents that the reproduction history does not contain a reproduction history record of the clip designation reproduction of the designated clip, the flow advances to step S373. At step S373, the reproduction control section 15 reads the top frame as the reproduction start frame from the disc 32 according to the XML description of the clip information file. Thereafter, the flow advances to step S374.

The first clip is a frame to be reproduced first in the XML description of the clip information file shown in FIG. 17 and FIG. 18. Thus, the first frame is not always a frame that is reproduced first in material data of a clip. Thus, if the XML description of the clip information file describes that the reproduction for a clip starts from a middle frame, this frame is the first frame.

At step S374, the reproduction control section 15 determines whether it has accepted the reproduction start position change command. When the user has operated the input section 21 and inputted the reproduction start position change command, the reproduction control section 15 determines that it has accepted the reproduction start position change command. Thereafter, the flow advances to step S375. At step S375, the reproduction control section 15 reads the designated frame as a reproduction start frame from the disc 32 according to the XML description of the clip information file. Thereafter, the flow advances to step S376. When the determined result at step S374 represents that the reproduction control section 15 has not accepted the reproduction start position change command, the flow advances to step S376 not through step S375.

At step S376, the reproduction control section 15 determines whether it completes the clip designation reproduction process. When the determined result represents that the reproduction control section 15 does not complete the clip designation reproduction process, the flow advances to step S377. At step S377, the reproduction control section 15 determines whether it has accepted the reproduction start command. When the determined result represents that the reproduction control section 15 has not accepted the reproduction start command, the flow returns to step S374. At step S374, the reproduction control section 15 repeats the process.

In other words, while the reproduction control section 15 is repeating the process from steps S374 to S377, the reproduction control section 15 waits until it has accepted the reproduction start command or completed the clip designation reproduction process. When the determined result at step S377 represents that the reproduction control section 15 has accepted the reproduction start command, the flow advances to step S378. At step S378, the reproduction control section 15 starts the reproduction from the reproduction start frame according to the XML description of the clip information file. When the reproduction control section 15 has started the reproduction, the flow advances to step S401 shown in FIG. 30.

At step S378, the reproduction control section 15 may reference the clip table of the index file. Each clip element of the clip table of the index file describes basically the same information as the clip information file. Thus, with reference to the corresponding clip element of the clip table, the reproduction control section 15 can read the clip and reproduce it.

When the determined result at step S376 shown in FIG. 25 represents that the reproduction control section 15 completes the clip designation reproduction process according to a user's command or the like, the flow advances to step S379. At step S379, the disc information file management section 63 of the reproduction control section 15 updates the reproduction history of the disc information file. When the disc insertion process has been performed, if the disc information file has been read from the disc 32, the disc information file is held in the disc information file hold section 52. In this case, the disc information file management section 63 updates the reproduction history of the disc information file held in the disc information file hold section 52. When the disc insertion process has been performed, if the disc information file has not been read from the disc 32, the disc information file is present only on the disc 32. In this case, the disc information file management section 63 supplies a reproduction history (disc information file) to be updated to the disc information file record control section 82. The disc information file record control section 82 updates the disc information file recoded on the disc 32 with the supplied reproduction history. Details of the update of the disc information file will be described later with reference to a flow chart shown in FIG. 27 and FIG. 28.

When the disc information file record control section 82 has updated the disc information file, the flow advances to step S380. At step S380, the reproduction control section 15 executes a completion process to complete the clip designation reproduction process.

Figure 26:
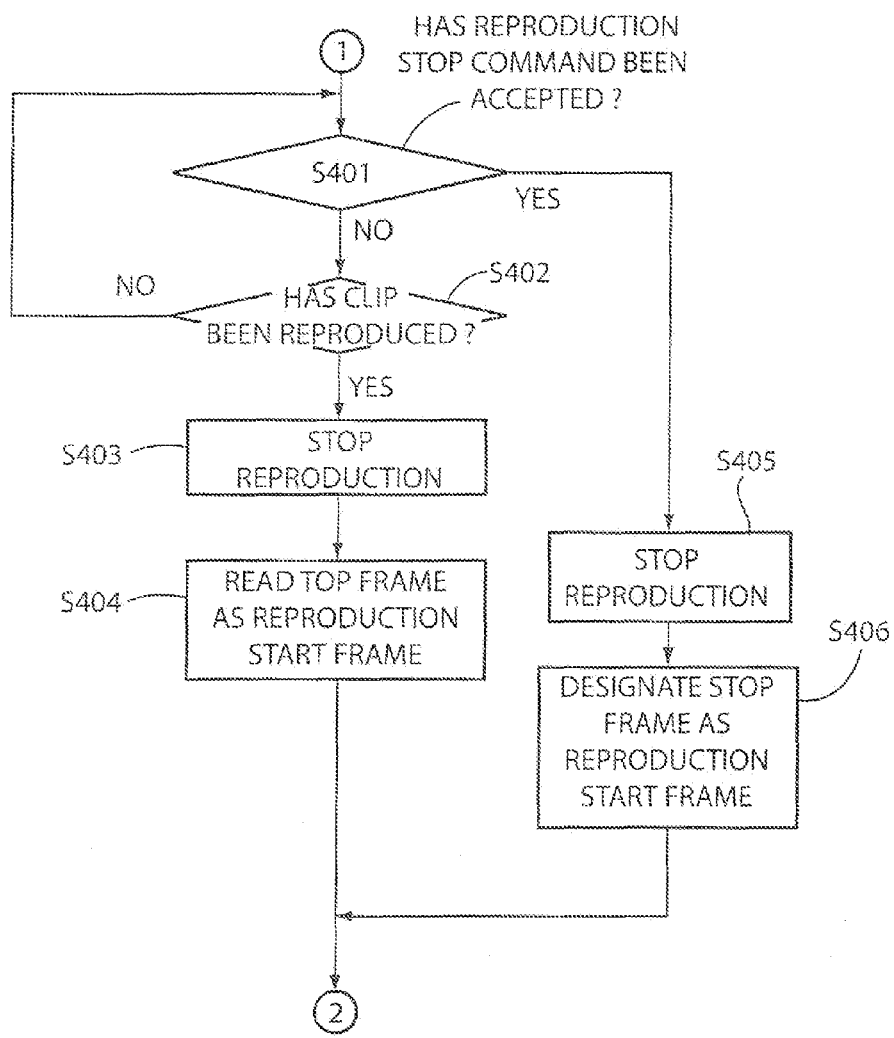
FIG. 26 is a flow chart describing the clip designation reproduction process as a part preceded by FIG. 25.

When the reproduction control section 15 has started the reproduction for the clip at step S378 shown in FIG. 25, the flow advances to step S401 shown in FIG. 26. At step S401, the reproduction control section 15 determines whether it has accepted the reproduction stop command. When the determined result represents that the reproduction control section 15 has not accepted the command and continues the reproduction process, the flow advances to step S402. At step S402, the reproduction control section 15 determines whether it has reproduced the clip. When the determined result represents that the reproduction control section 15 has not reproduced the clip, the flow returns to step S401. At step S401, the reproduction control section 15 continues the process.

When the determined result at step S402 represents that the reproduction control section 15 has reproduced the clip, the flow advances to step S403. At step S403, the reproduction control section 15 stops the reproduction. At step S404, the reproduction control section 15 reads the top frame as the reproduction start frame according to the XML description of the clip information file. Thereafter, the flow returns to step S376 shown in FIG. 29. At step S376, the reproduction control section 15 repeats the process.

In other words, when the reproduction control section 15 has reproduced the last frame in the clip designation reproduction, the reproduction control section stops the reproduction process and designates the first frame in the XML description of the clip information file as the reproduction start frame of the next reproduction process.

When the determined result at step S401 shown in FIG. 26 represents that the reproduction control section 15 has accepted the reproduction stop command from the user or the like while reproducing the clip, the flow advances to step S405. At step S405, the reproduction control section 15 stops the reproduction. At step S406, the reproduction control section 15 designates the stop frame as the reproduction start frame of the next reproduction process. After the reproduction control section 15 has designated the reproduction start frame, the flow returns to step S3376 shown in FIG. 25. At step S3376, the reproduction control section 15 repeats the process.

Thus, when the record and reproduction apparatus 1 performs the clip designation reproduction, the record and reproduction apparatus 1 can record a reproduction history on the disc 32. The record and reproduction apparatus 1 can use the reproduction history in the next clip designation reproduction process and resume the clip designation reproduction from the last reproduction stop position.

When the reproduction control section 15 has completed the reproduction process, each section of the record and reproduction apparatus 1 executes a disc information file update process that updates the reproduction history of the disc information file recorded on the disc 32. Next, with reference to FIG. 27 and FIG. 28, the disc information file update process will be described.

When the disc information file update process has been started, the flow advances to step S421 shown in FIG. 31. At step S421, the disc information file management section 63 determines whether the type of the reproduction that the reproduction control section 15 has stopped is the tape-like reproduction.

When the disc has been inserted, if the disc information file has not been read, before step S421, the disc information file read section 62 reads the disc information file from the disc 32 and causes the disc information file hold section 52 to hold the disc information file.

When the determined result at step S421 represents that the type of the reproduction that the reproduction control section 15 has stopped is the tape-like reproduction, the flow advances to step S422. At step S422, the disc information file management section 63 generates a history record of this tape-like reproduction with the disc internal ID of the clip for which the take-like reproduction was stopped. Thereafter, the flow advances to step S423. At step S423, the disc information file management section 63 references a reproduction history (current reproduction history) of the disc information file held in the disc information file hold section 52 and determines whether the current reproduction history contains a history record of the tape-like reproduction.

When the determined result at step S423 represents that the current reproduction history contains a history record of the tape-like reproduction, the flow advances to step S424. At step S424, the disc information file management section 63 deletes an old history record of the tape-like reproduction from the reproduction history of the disc information file held in the disc information file hold section 52 and registers the newly generated history record of the tape-like reproduction at the newest position of the reproduction history. In the case shown in FIG. 11, the disc information file management section 63 deletes the history record of line 6, FIG. 11, of the tape-like reproduction, moves the history record of line 5 to the position of line 6, moves the history record of line 4 to the position of line 5, and inserts the newly generated history record of the tape like reproduction in the position of the top line (line 4, the position of the newest history record of the reproduction history) of the reproduction history.

After the disc information file management section 63 has completed the process at step S424, the flow advances to step S426.

When the determined result at step S423 represents that the current reproduction history does not contain a history record of the tape-like reproduction, the flow advances to step S425. At step S425, the disc information file management section 63 deletes the oldest history record of the reproduction history of the disc information file held in the disc information file hold section 52. Thereafter, the flow advances to step S422. At step S422, the disc information file management section 63 registers the newly generated history record of the tape-like reproduction at the newest record position of the reproduction history. For example, if line 6 of the XML description shown in FIG. 11 is not a history record of the tape-like reproduction, the disc information file management section 63 deletes the history record of line 9 shown in FIG. 11, moves the history records of line 4 to line 8 to the positions of line 5 to line 9, respectively, and inserts the newly generated history record of the tape-like reproduction in the position of the top line (line 4, the newest history record position of the reproduction history) of the reproduction history.

After the disc information file management section 63 has completed the process at step S425, the flow advances to step S426.

When the determined result at step S421 represents that the type of the reproduction that the reproduction control section 15 has stopped is not the tape-like reproduction, the flow advances to step S426.

At step S426, the disc information file management section 63 determines whether the type of the reproduction that the reproduction control section 15 has stopped is the edit list designation reproduction.

When the determined result at step S426 represents that the type of the reproduction that the reproduction control section 15 has stopped is the edit list designation reproduction, the flow advances to step S427. At step S427, the disc information file management section 63 generates a history record of this edit list designation reproduction with the disc internal ID of the edit list for which the reproduction was stopped. Thereafter, the flow advances to step S428. At step S428, the disc information file management section 63 references a reproduction history (current reproduction history) of the disc information file held in the disc information file hold section 52 and determines whether the current reproduction history contains a history record of the edit list designation reproduction for the same edit list as the newly generated history record of the edit list designation reproduction.

When the determined result at step S428 represents that the current reproduction history contains a history record of the edit list designation reproduction for the same edit list as the newly generated history record of the edit list designation reproduction, the flow advances to step S429. At step S429, the disc information file management section 63 deletes an old history record of the edit list designation reproduction from the reproduction history of the disc information file held in the disc information file hold section 52 and registers the new history record generated at step S427 of the edit list designation reproduction at the newest position of the reproduction history. When the disc information file management section 63 generates a history record of the reproduction of an edit list with disc internal ID [E0004] shown in FIG. 11, the disc information file management section 63 deletes the history record of line 7, FIG. 11, of the edit list designation reproduction, moves the history record of line 6 to the position of line 5, moves the history record of line 5 to the position of line 6, move the history record of line 4 to the position of line 4, and inserts the newly generated history record of the edit list designation reproduction of the edit list with disc internal ID [E0004] in the position of the top line (line 4, the position of the newest history record) of the reproduction history.

Figure 28:
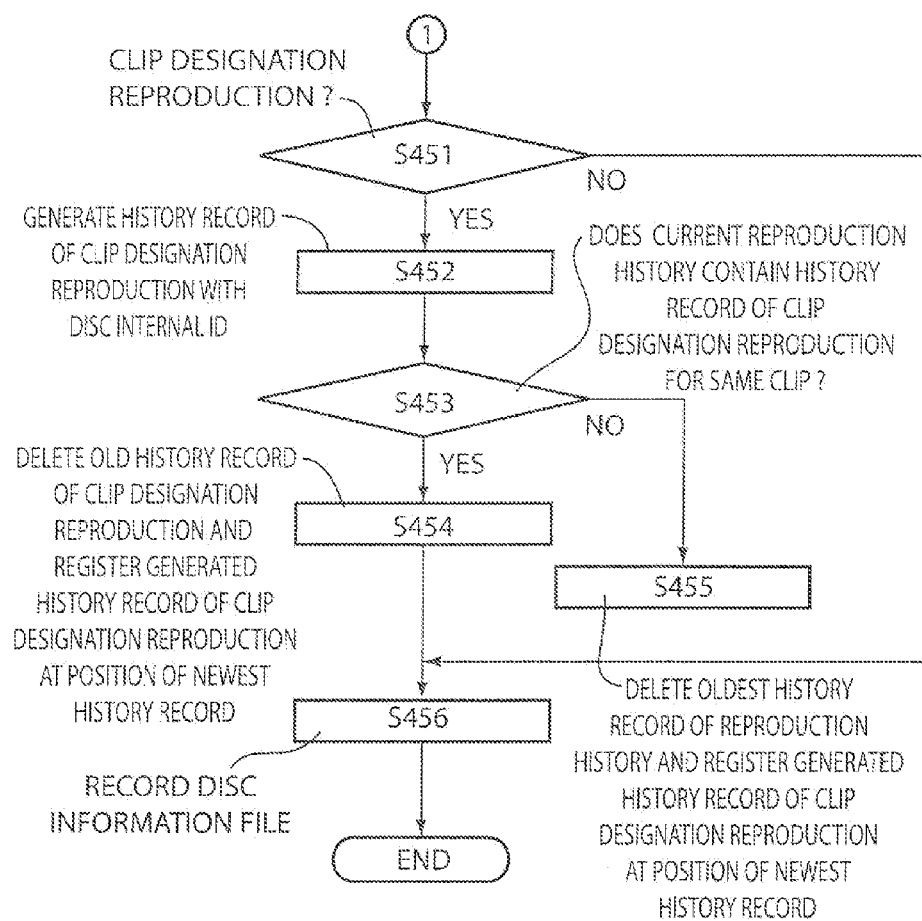
FIG. 28 is a flow chart describing the disc information file update process as a part preceded by FIG. 27.

After the disc information file management section 63 has completed the process at step S429, the flow advances to step S451 shown in FIG. 28.

Figure 27:
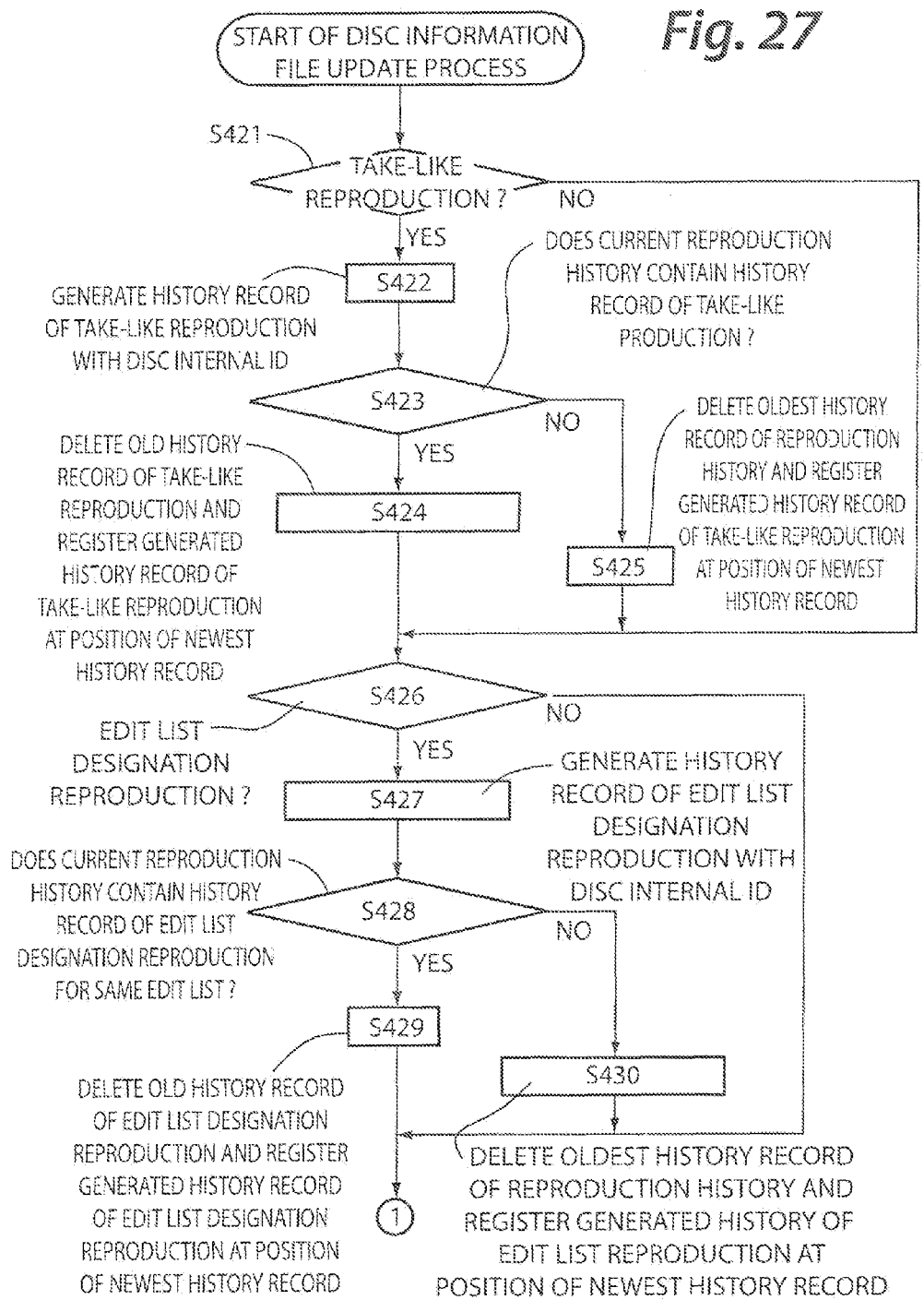
FIG. 27 is a flow chart describing a disc information file update process.

When the determined result at step S428 shown in FIG. 27 represents that the current reproduction history does not contain a history record of the edit list designation reproduction for the same edit list as the newly generated history record of the edit list designation reproduction, the flow advances to step S430. At step S430, the disc information file management section 63 deletes the oldest history record of the reproduction history of the disc information file held in the disc information file hold section 52. Thereafter, the flow advances to step S427. At step S427, the disc information file management section 63 registers the newly generated history record of the edit list designation reproduction at the newest record position of the reproduction history. For example, in the case shown in FIG. 11, if the disc information file management section 63 generates a history record of the reproduction of an edit list with disc internal ID [E0003], since the reproduction history shown in FIG. 11 does not contain a history record of the edit list designation reproduction of the edit list with disc internal ID [E0003], the disc information file management section 63 deletes the history record of line 9, moves the history records of line 4 to line 8 to the positions of line 5 to line 9, respectively, and inserts the newly generated history record of the edit list designation reproduction of the edit list with disc internal ID [E0003] in the position of the top line (line 4, the newest history record position of the reproduction history) of the reproduction history.

After the disc information file management section 63 has completed the process at step S430, the flow advances to step S451 shown in FIG. 28.

When the determined result at step S426 shown in FIG. 27 represents that the type of the reproduction that the reproduction control section 15 has stopped is not the edit list designation reproduction, the flow advances to step S451 shown in FIG. 28.

At step S451 shown in FIG. 28, the disc information file management section 63 determines whether the type of the reproduction that the reproduction control section 15 has stopped is the clip designation reproduction.

When the determined result at step S451 represents that the type of the reproduction that the reproduction control section 15 has stopped is the clip designation reproduction, the flow advances to step S452. At step S452, the disc information file management section 63 generates a history record of this clip designation reproduction with the disc internal ID of the clip for which the reproduction was stopped. Thereafter, the flow advances to step S453. At step S453, the disc information file management section 63 references a reproduction history (current reproduction history) of the disc information file held in the disc information file hold section 52 and determines whether the current reproduction history contains a history record of the clip designation reproduction for the same clip as the newly generated history record of the clip designation reproduction.

When the determined result at step S453 represents that the current reproduction history contains a history record of the clip designation reproduction for the same clip as the newly generated history record of the clip designation reproduction, the flow advances to step S454. At step S454, the disc information file management section 63 deletes an old history record of the clip designation reproduction from the reproduction history of the disc information file held in the disc information file hold section 52 and registers the new history record generated at step S457 of the clip designation reproduction at the newest position of the reproduction history. When the disc information file management section 63 generates a history record of the clip designation reproduction for a clip with disc internal ID [C0003]shown in FIG. 11, the disc information file management section 63 deletes the history record of line 4 of the clip designation reproduction and inserts the newly generated history record of the clip designation reproduction for the clip with disc internal ID [C0003] in the position of the top line (line 4, the position of the newest history record) of the reproduction history.

Although the history record of the disc information file shown in FIG. 11 contains a history record of disc internal ID [C0003], line 6, FIG. 11, since this history record is for the take-like reproduction, not the clip designation reproduction. Thus, at step S454, the disc information file management section 63 does not update the reproduction history.

After the disc information file management section 63 has completed the process at step S454, the flow advances to step S456.

When the determined result at step S453 represents that the current reproduction history does not contain a history record of the clip designation reproduction for the same clip as the newly generated history record of the clip designation reproduction, the flow advances to step S455. At step S455, the disc information file management section 63 deletes the oldest history record of the reproduction history of the disc information file held in the disc information file hold section 52. Thereafter, the flow advances to step S452. At step S452, the disc information file management section 63 registers the newly generated history record of the clip designation reproduction at the newest record position of the reproduction history. For example, in the case shown in FIG. 11, if the disc information file management section 63 generates a history record of the clip designation reproduction for a clip with disc internal ID [C0001], since the reproduction history shown in FIG. 11 does not contain a history record of the clip designation reproduction for the clip with disc internal ID [C0001], the disc information file management section 63 deletes the history record of line 9, moves the history records of line 4 to line 8 to the positions of line 5 to line 9, respectively, and inserts the newly generated history record of the clip designation reproduction for the clip with disc internal ID [C0001] in the position of the top line (line 4, the newest history record position of the reproduction history) of the reproduction history.

After the disc information file management section 63 has completed the process at step S455, the flow advances to step S456 shown in FIG. 32.

When the determined result at step S451 represents that the type of the reproduction that the reproduction control section 15 has stopped is not the clip designation reproduction, the flow advances to step S456.

At step S456, the disc information file record control section 82 records the updated disc information file held in the disc information file hold section 52 on the disc 32 so that the updated disc information file is overwritten on the disc information file recorded on the disc 32.

After the disc information file record control section 82 has completed the process at step S456, the disc information file record control section 82 completes the disc information file update process.

When the disc information file update process is executed in the foregoing manner, the record and reproduction apparatus 1 can record a reproduction history of various types of reproduction methods for material data on the disc 32, use the reproduction history in the next reproduction process, and resume the reproduction from the last reproduction stop position (frame).

The reproduction history is generated so that it designates a clip and an edit list with a disc internal ID. Thus, the data amount of the reproduction history is decreased. In addition, when the record and reproduction apparatus 1 resumes the reproduction according to the reproduction history, the load of the process that reads a clip and an edit list can be lightened.

In the foregoing, an example of which material data are reproduced by the record and reproduction apparatus shown in FIG. 1 was described. Instead, the present invention may be applied to an edit apparatus that edits material data. In addition, when the index file that totally manages file names (including absolute paths), UMIDs, and disc internal IDs of clips or edit lists is recorded on the disc 32, the present invention may be applied to a reproduction apparatus that reproduce material data. The structure of the edit apparatus according to the present invention needs to contain the structure of the record and reproduction apparatus 1 shown in FIG. 1. Since the process that reproduces material data and the process that generates the index file and adds a clip and an edit list in the edit apparatus are the same as those in the record and reproduction apparatus 1, their description will be omitted.

Figure 29:
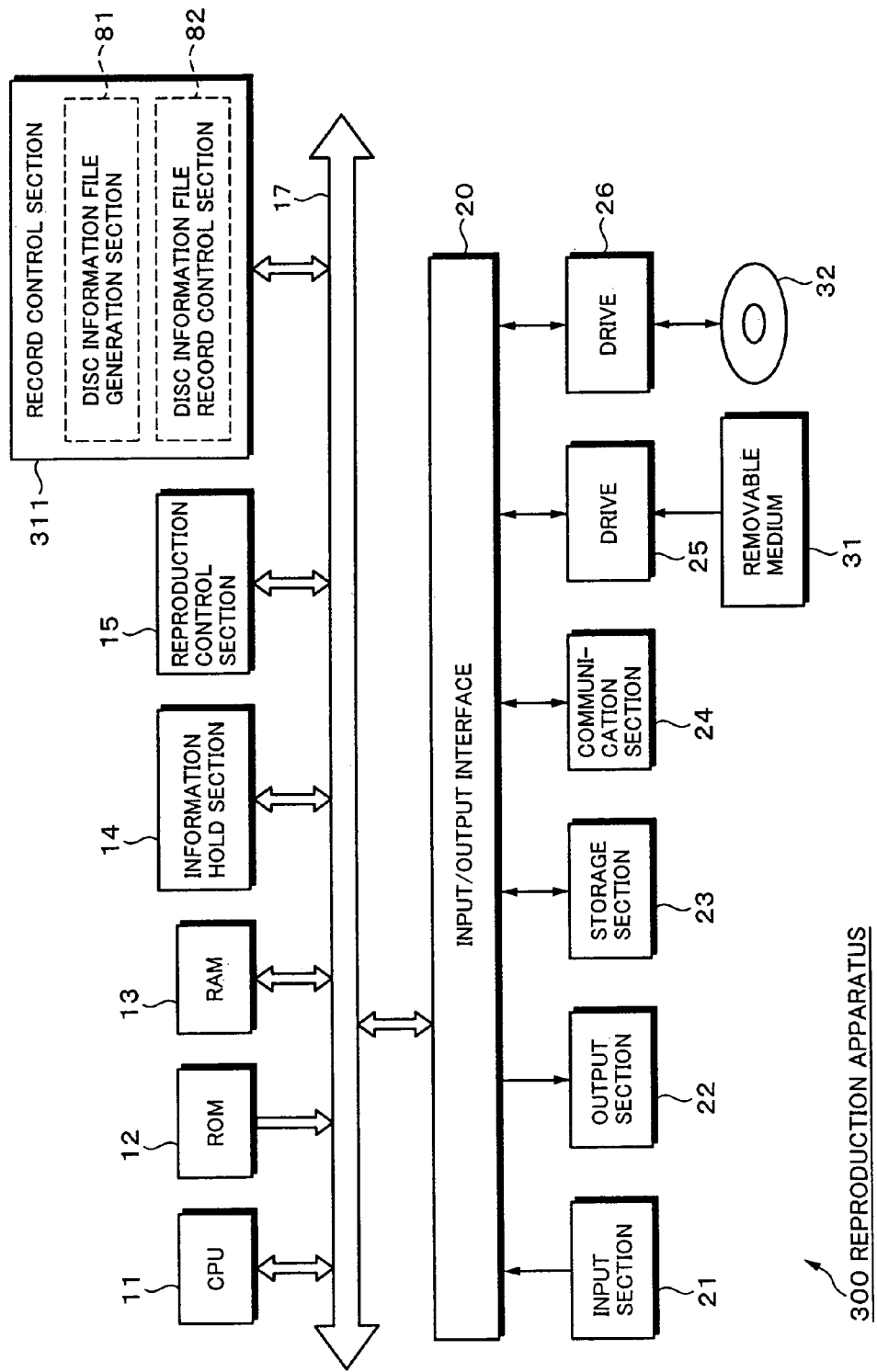
FIG. 29 is a block diagram showing an example of the structure of a reproduction apparatus according to the present invention.

FIG. 29 is a block diagram showing an example of the structure of the reproduction apparatus according to the present invention. In FIG. 29, similar sections to those in FIG. 1 are denoted by similar reference numerals and their description will be omitted.

A reproduction apparatus 300 is a reproduction apparatus that reproduces material data recorded on the foregoing disc 32. The reproduction apparatus 300 has a record control section 311 that records a disc information file on the disc 32. Like the case of the foregoing record and reproduction apparatus 1, the reproduction apparatus 300 can use the disc information file and reproduce the material data from the last reproduction stop position.

Like the record control section 16 of the record and reproduction apparatus 1 shown in FIG. 4, the record control section 311 has a disc information file generation section 81 and a disc information file record control section 82. With them, the record control section 311 can generate the disc information file and record a newly generated reproduction history to the disc 32 loaded into the drive 26.

The reproduction apparatus 300 omits a material data record function from the record and reproduction apparatus 1 shown in FIG. 1. The reproduction apparatus 300 performs a reproduction process for material data recorded on the disc 32 in the same manner as the record and reproduction apparatus 1 does. In other words, the reproduction apparatus 300 reproduces material data recorded on the disc 32 according to a method such as the tape-like reproduction, the edit list designation reproduction, or the clip designation reproduction and records the reproduction history on the disc 32. When the reproduction apparatus 300 starts the reproduction, the reproduction apparatus 300 can reference a reproduction history recoded on the disc 32 and reproduce material data from the last reproduction stop position.

In addition, since the reproduction history is generated so that it designates a clip and an edit list with a disc internal ID, the data amount of the reproduction history can be decreased. In addition, when the reproduction apparatus 300 resumes the reproduction according to the reproduction history, the load of the process that reads a clip and an edit list can be lightened.

In the foregoing, the reproduction stop position as a reproduction history in the disc information file is stored in the unit of a frame. Instead, the reproduction stop position may be stored in any unit. For example, the reproduction stop position may be in the unit of a GOP (Group of Picture). Instead, the reproduction stop position may be stored with a time code different from a frame.

In the foregoing, the reproduction stop position as the reproduction history of the disc information file is stored as the number of frames starting from the first frame (or top frame). Instead, the reproduction stop position may be based on any position.

As described above, the record and reproduction apparatus, the edit apparatus, or the reproduction apparatus according to the present invention records a reproduction history of material data as a file different from other information on the disc 32. When the apparatus starts reproducing the material data, the apparatus performs a process that decides a reproduction start position with the reproduction history recorded on the disc 32. These processes may be performed in any method. In addition, another process may be performed along with these processes. As long as the record and reproduction apparatus, the edit apparatus, or the reproduction apparatus according to the present invention can execute these processes, the structure of the apparatus is not limited to the foregoing structure.

The foregoing sequence of processes can be executed by hardware or software. When these processes are executed by software, the foregoing video process apparatus is composed by a personal computer as shown in FIG. 30. In FIG. 30, similar sections to those in FIG. 1 are denoted by similar reference numerals and their description will be omitted.

In FIG. 30, a CPU 401 of a personal computer 400 executes various processes according to a program stored in a ROM 402 or a program loaded from a storage section 413 to a RAM 403. When necessary, the RAM 403 also stores data and so forth that the CPU 401 needs when it executes various processes.

The CPU 401, the ROM 402, and the RAM 403 are mutually connected through a bus 404. Connected to the bus 404 is also an input/output interface 410.

Connected to the input/output interface 410 are an input section 411 composed of a keyboard, a mouse, and so forth, an output section 412 composed of a display device such as a CRT (Cathode Ray Tube) or an LCD (Liquid Crystal Display), a speaker, and so forth, a storage section 413 composed of a hard disk or the like, and a communication section 414 composed of a modem and so forth. The communication section 414 performs a communication process through a network including the Internet.

When necessary, a drive 415 is connected to the input/output interface 410. When necessary, a removable medium 421 such as a magnetic disc, an optical disc, an optical-magnetic disc, or a semiconductor memory is loaded into (attached to) the drive 415. When necessary, a computer program read from the removable medium 421 is installed to the storage section 413.

When the sequence of processes are executed by software, a program that composes the software is installed from a network or a record medium.

As shown in FIG. 1, FIG. 29, or FIG. 30, the record medium may be unaccompanied by the main body of the apparatus and delivered to the user to provide the program. In this case, the record medium on which the program has been recorded may be a magnetic disc (including a floppy disc), an optical disc (including CD-ROM (Compact Disc-Read Only Memory) and DVD (Digital Versatile Disc)), an optical-magnetic disc (including MD (Mini-Disc)), the removable medium 31 or the removable medium 421 composed of a semiconductor memory or the like. Instead, the record medium may be pre-installed to the main body of the apparatus. In this case, the record medium on which the program has been recorded may be the ROM 12, the ROM 402, or a hard disk included in the storage section 23 or the storage section 413.

In this specification, steps that describe a program provided by a medium are executed sequentially in the order of which they are described. Instead, the steps may be executed in parallel or discretely.

In this specification, the system represents a whole apparatus composed of a plurality of devices.

As described above, according to the present invention, video data, audio data, and so forth recorded on a record medium can be reproduced. In particular, according to the present invention, convenience of a record medium can be improved. For example, according to the present invention, a record process and a reproduction process can be more easily performed than before.

The invention claimed is:

1. An information process apparatus that manages data recorded on a disc record medium, comprising:
first generation means for generating management information that associates a first identifier, that can identify the data in any storage area external to the disc record medium, with information about the data;
second generation means for generating a second identifier that can identify the data only in a storage area of the disc record medium, the data amount of the second identifier being smaller than that of the first identifier;

addition means for adding the second identifier generated by the second generation means to the management information to associate the second identifier with the information about the data; and record means for recording the management information, to which the second identifier has been added by the addition means, on the disc record medium, wherein the information processing apparatus references the data in any storage area external to the disc record medium with only the first identifier and references the data only in the storage area of the disc record medium with either of the first identifier and the second identifier.

2. The information process apparatus as set forth in claim 1, wherein the data contain at least one of video data, audio data, and meta data added to the video data.

3. The information process apparatus as set forth in claim 1, wherein the information about the data contains information about a directory path name and a file name of the data.

4. The information process apparatus as set forth in claim 1, wherein the first identifier is composed of 64 bytes and the second identifier is composed of 20 bits.

5. The information process apparatus as set forth in claim 1, wherein the second identifier is composed of a first portion that represents the type of the data and a second portion that represents a serial number of the second identifier.

6. The information process apparatus as set forth in claim 5, further comprising:

search means for searching a plurality of second identifiers recorded on the disc record medium for the maximum value of the second portion, wherein the second generation means generates the second identifier according to the maximum value for which the search means has searched so that the second identifier does not become redundant to the plurality of second identifiers recorded on the disc record medium.

7. The information process apparatus as set forth in claim 1, further comprising:

reproduction means for reading the data from the disc record medium and reproducing the data.

8. The information process apparatus as set forth in claim 7, further comprising:

read means for reading the management information read by the record means; and hold means for holding the management information read by the read means, wherein the reproduction means reads the data to be reproduced from the disc record medium according to the management information read by the read means and held by the hold means and reproduces the data.

9. An information process method for an information process apparatus that manages data recorded on a disc record medium, the method comprising the steps of:

generating management information that associates a first identifier, that can identify the data in any storage area external to the disc record medium, with information about the data;

generating a second identifier that can identify the data only in a storage area of the disc record medium, the data amount of the second identifier being smaller than that of the first identifier;

adding the second identifier generated by a process of the second generation step to the management information to associate the second identifier with the information about the data; and controlling the recording of the management information, to which the second identifier has been added by a process of the addition step, on the disc record medium, wherein the information processing apparatus references the data in any storage area external to the disc record medium with only the first identifier and references the data only in the storage area of the disc record medium with either of the first identifier and the second identifier.

10. A computer program, embodied on a non-transitory computer-readable medium, that causes a computer to execute a process that reproduces data recorded on a record disc medium, the program comprising the steps of:

generating management information that associates a first identifier, that can identify the data in any storage area external to the disc record medium, with information about the data;

generating a second identifier that can identify the data only in a storage area of the disc record medium, the data amount of the second identifier being smaller than that of the first identifier;

adding the second identifier generated by a process of the second generation step to the management information to associate the second identifier with the information about the data; and controlling the recording of the management information, to which the second identifier has been added by a process of the addition step, on the disc record medium, wherein the data is referenced in any storage area external to the disc record medium with only the first identifier and the data is referenced only in the storage area of the disc record medium with either of the first identifier and the second identifier.

11. A computer readable disc record medium on which data reproduced by an information process apparatus are recorded, management information that associates a first identifier, that can identify the data in any storage area external to the disc record medium and a second identifier that can identify the data only in a storage area of the disc record medium, the data amount of the second identifier being smaller than that of the first identifier, with information about the data being recorded on the disc record medium, wherein the data is referenced in any storage area external to the disc record medium with only the first identifier and the data is referenced only in the storage area of the disc record medium with either of the first identifier and the second identifier.

* * * * *